United States Patent
Naito et al.

(10) Patent No.: US 10,538,953 B2
(45) Date of Patent: Jan. 21, 2020

(54) VACUUM HEAT INSULATING MEMBER, SEALING MATERIAL USED THEREFOR, AND A PRODUCTION METHOD OF THE VACUUM HEAT INSULATING MEMBER

(71) Applicant: HITACHI CHEMICAL COMPANY, LTD., Tokyo (JP)

(72) Inventors: Takashi Naito, Tokyo (JP); Kei Yoshimura, Tokyo (JP); Yuji Hashiba, Tokyo (JP); Shinichi Tachizono, Tokyo (JP); Takuya Aoyagi, Tokyo (JP); Tatsuya Miyake, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 123 days.

(21) Appl. No.: 15/722,581

(22) Filed: Oct. 2, 2017

(65) Prior Publication Data
US 2018/0094475 A1 Apr. 5, 2018

(30) Foreign Application Priority Data
Oct. 3, 2016 (JP) .................. 2016-195350

(51) Int. Cl.
| | |
|---|---|
| *E06B 3/663* | (2006.01) |
| *C03C 8/02* | (2006.01) |
| *C03C 8/24* | (2006.01) |
| *E06B 3/66* | (2006.01) |
| *E06B 3/673* | (2006.01) |

(Continued)

(52) U.S. Cl.
CPC .......... *E06B 3/66342* (2013.01); *C03C 8/02* (2013.01); *C03C 8/24* (2013.01); *E06B 3/6612* (2013.01); *E06B 3/677* (2013.01); *E06B 3/6733* (2013.01); *C03C 27/06* (2013.01); *C03C 2207/00* (2013.01); *E06B 3/66357* (2013.01)

(58) Field of Classification Search
CPC .............. E06B 3/6612; E06B 3/66342; E06B 3/66357; Y02B 80/24; Y02A 30/25; C03C 8/24; C03C 8/02; C03C 8/18; C03C 8/20; C03C 8/14; C03C 27/06; C03C 2207/00
See application file for complete search history.

(56) References Cited

U.S. PATENT DOCUMENTS

| | | | |
|---|---|---|---|
| 6,444,281 B1 * | 9/2002 | Wang ................. | E06B 3/6612 428/34 |
| 2014/0145122 A1 | 5/2014 | Sawai et al. | |
| 2016/0001524 A1 | 1/2016 | Abe et al. | |

FOREIGN PATENT DOCUMENTS

| | | |
|---|---|---|
| CN | 105669007 A | 6/2016 |
| JP | 2013-032255 A | 2/2013 |

(Continued)

*Primary Examiner* — Donald J Loney
(74) *Attorney, Agent, or Firm* — Volpe and Koenig, P.C.

(57) ABSTRACT

Provided are a vacuum heat insulating member which includes: a first substrate; a second substrate; and a sealing part disposed between the first substrate and the second substrate, in which an internal space is formed by surrounding by the first substrate, the second substrate and the sealing part, and in which the sealing part includes a glass phase and a metal phase, the metal phase being disposed on a side of the internal space of the glass phase. Thus, in the vacuum heat insulating member, an amount of a gas released from the glass phase to the internal space can be decreased and a high heat insulating property can be kept.

14 Claims, 27 Drawing Sheets

(51) Int. Cl.
   *E06B 3/677* (2006.01)
   *C03C 27/06* (2006.01)

(56) References Cited

FOREIGN PATENT DOCUMENTS

| | | |
|---|---|---|
| WO | 2014/136151 A1 | 9/2014 |
| WO | 2016/051788 A1 | 4/2016 |

* cited by examiner

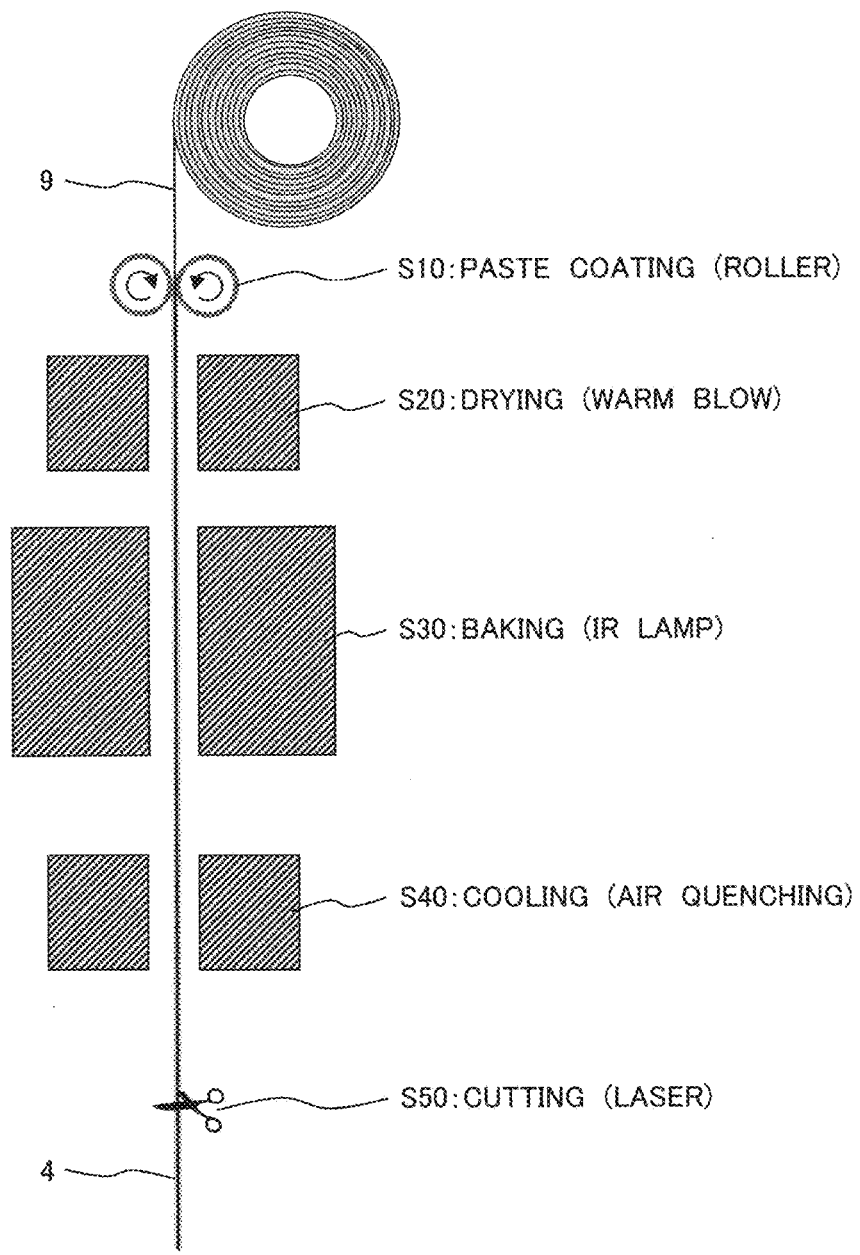

VACUUM HEAT INSULATING MEMBER, SEALING MATERIAL USED THEREFOR, AND A PRODUCTION METHOD OF THE VACUUM HEAT INSULATING MEMBER

CLAIM OF PRIORITY

The present application claims priority from Japanese Patent application serial No. 2016-195350, filed on Oct. 3, 2016, the content of which is hereby incorporated by reference into this application.

BACKGROUND OF THE INVENTION (Field of the Invention)

The present invention relates to a vacuum heat insulating member, a sealing material used therefor, and a production method of the vacuum heat insulating member.

(Description of Related Art)

Vacuum heat insulating members such as vacuum heat insulating multilayer glass panels are applied to window glass for building materials. The vacuum heat insulating members include two substrates and a sealing part disposed between the two substrates, and have a closed space formed by surrounding by the two substrates and the sealing part. The sealing part is disposed at a peripheral part of the vacuum heat insulating member. The closed space is evacuated (decompressed), and thus the closed space is kept in the vacuum state for a long time. This can develop and maintain a high heat insulating property. In order to seal the closed space of the vacuum heat insulating member airtightly, sealing materials containing a low-melting glass and low thermal expansion filler particles are applied.

In recent years, ZEH (zero energy house) and ZEB (zero energy building) are going to be promoted worldwide on national grounds. ZEH and ZEB require a window glass having the heat insulating property much higher than that of a conventional multilayer glass window. In the conventional multilayer glass window, the heat insulating property in the closed space inside the panel is higher in the order of an air layer, an argon layer, and a vacuum layer, and heat transmission coefficient thereof ranges from 3.0 to 1.4 W/m$^2$·K. By the way, in the window glass for ZEH or ZEB, the heat transmission coefficient of 0.7 W/m$^2$·K or less is required. And 0.4 W/m$^2$·K or less is required depending on countries and sites. In order to satisfy the requirement, it is essential to increase the heat insulating property by increasing the evacuation inside the multilayer glass window. Further, use of less cracking tempered glass subjected to a thermal tempering, etc. is required for the panel glass for preventing breakage caused by the increased evacuation, or for security and crime prevention. For the tempered glass, high strength is intended to obtain by forming a compression tempered layer at the surface. However, the tempered layer is gradually decreased at a heating temperature of about 320° C. or higher and is eliminated at a heating temperature higher than about 400° C. Therefore, in a case of using the tempered glass to the panel glass, it is difficult to use a lead type low-melting glass or bismuth type low-melting glass having a sealing temperature of 400° C. or higher.

Further, green procurement and green design have tended to be increased worldwide and more safety materials are required. Since the lead type low-melting glass contains much lead which is designated as the prohibited substance according to RoHS restriction, such material is not preferred to be used for the vacuum heat insulating multilayer glass panel etc. from the point of view of an environmental problem.

Further, when the sealing temperature is lowered, production tact time can be shortened for the vacuum heat insulating multilayer glass panels for which rapid heating and cooling is difficult.

Furthermore, since the capital investment for mass production facilities can also be decreased, the glass panels can be produced at a reduced cost.

In view of the foregoing, high heat insulation by high evacuation and lowering of the sealing temperature have been demanded strongly for the vacuum heat insulating members such as vacuum heat insulating multilayer glass panels.

International Laid Open No. WO2014/136151 (Patent Literature 1) and International Laid Open No. WO2016/051788 (Patent Literature 2) propose provision of a gas adsorbent capable of adsorbing gases released from an inside of the panel (getter) and a gas adsorption member formed by carrying the getter on inorganic fibers or porous materials to the inside of the panel for attaining high heat insulation, that is, high evacuation. The getter includes, specifically, zeolite, zeolite ion-exchanged with copper ions, Fe—V—Zr alloys, Ba—Al alloys, etc.

Japanese Patent Application Laid-Open No. 2013-32255 (Patent Literature 3) discloses a lead-free low-melting glass composition containing $Ag_2O$, $V_2O_5$ and $TeO_2$ at a total content of $Ag_2O$, $V_2O_5$ and $TeO_2$ of 75 mass % or more and less than 100 mass %, and one or more of $P_2O_5$, BaO, $K_2O$, $WO_3$, $Fe_2O_3$, $MnO_2$, $Sb_2O_3$, and ZnO as a remainder by more than 0 mass % and 25 mass % or less. The $Ag_2O$—$V_2O_5$—$TeO_2$ series lead-free low-melting glass composition has a softening point ranging from 268 to 320° C., which is determined on the second endothermic peak temperature in differential thermal analysis (DTA), and softens to fluidize at a temperature remarkably lower than that of the conventional lead type or bismuth type low-melting glass composition.

SUMMARY OF THE INVENTION

A vacuum heat insulating member includes: a first substrate; a second substrate; and a sealing part disposed between the first substrate and the second substrate, in which an internal space is formed by surrounding by the first substrate, the second substrate and the sealing part. And the sealing part of the vacuum heat insulating member includes a glass phase and a metal phase, the metal phase being disposed on a side of the internal space of the glass phase.

In accordance with an aspect of the present invention, in the vacuum heat insulating member, an amount of a gas released from the glass phase to the internal space can be decreased and a high heat insulating property can be kept.

BRIEF DESCRIPTION OF THE DRAWINGS

FIG. 7 is a schematic view illustrating a production method of a sealing material according to a preferred embodiment of the present invention;

DETAILED DESCRIPTION OF THE PREFERRED EMBODIMENTS

The gas adsorbent and a gas adsorption member disclosed in the Patent Literature 1 and the Patent Literature 2 prevent or suppress the vacuum degree from worsening due to gasses released from respective materials inside the panel, for example, gases such as nitrogen, oxygen, and water after airtight sealing. However, when a glass is used which has the remarkably low sealing temperature like the lead-free low-melting glass disclosed in the Patent Literature 3, there was a problem that activation of the gas adsorbent of the Patent Literature 1 or the gas adsorption member of the Patent Literature 2 is insufficient and no sufficient gas adsorption efficiency can be provided. Accordingly, for improving the heat insulating property of the multilayer glass panel, it was extremely important to decrease the amount of the gas released from the inside of the panel thereby increasing the evacuation inside the panel.

The present invention intends to provide a vacuum heat insulating member which has a less gas released from the glass phase to the internal space and which keeps a high heat insulating property.

In detail, in the vacuum heat insulating member, an exposed area on the glass phase to the internal space can be decreased and an amount of $CO_2$ gas released from the glass phase to the internal space can be decreased. As a result, a vacuum degree in the internal space can be improved, the heat insulating property can be improved and the internal space can be kept in a vacuum state for a long time.

Preferred embodiments of the present invention are to be described specifically with reference to the accompanying drawings. It should be noted that the invention is not restricted to the embodiments described herein but can be modified to any combination or improvement within a range not departing the gist of the invention.

<Vacuum Heat Insulating Member>

Figure 1A:
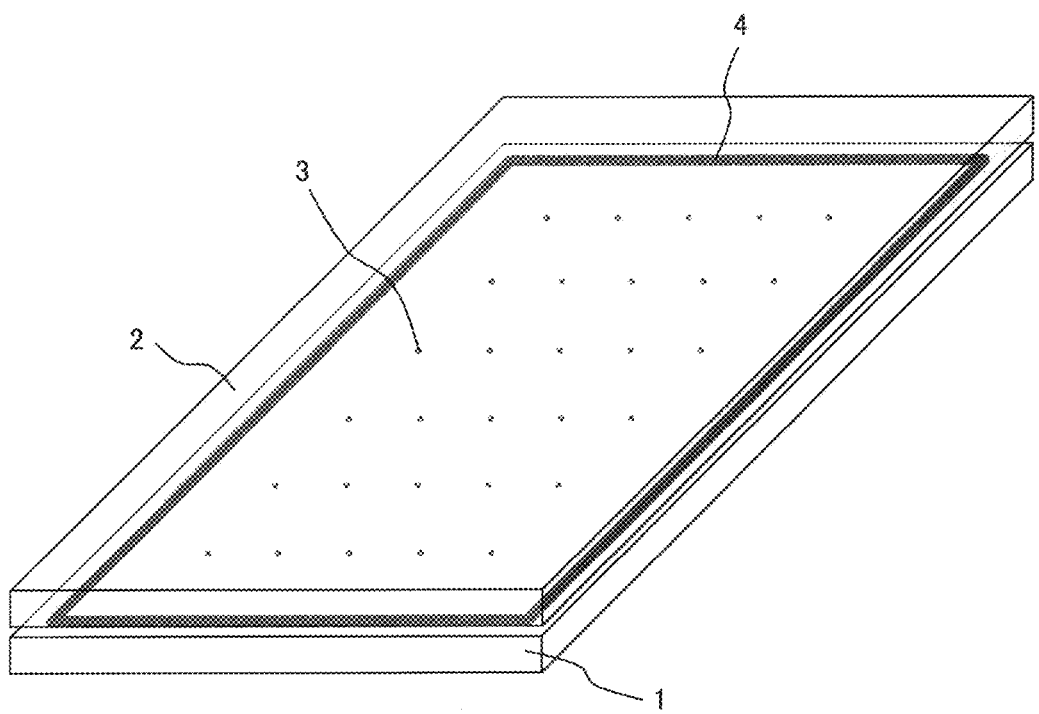
FIG. 1A is a schematic perspective view of a conventional vacuum heat insulating member.
Figure 1B:
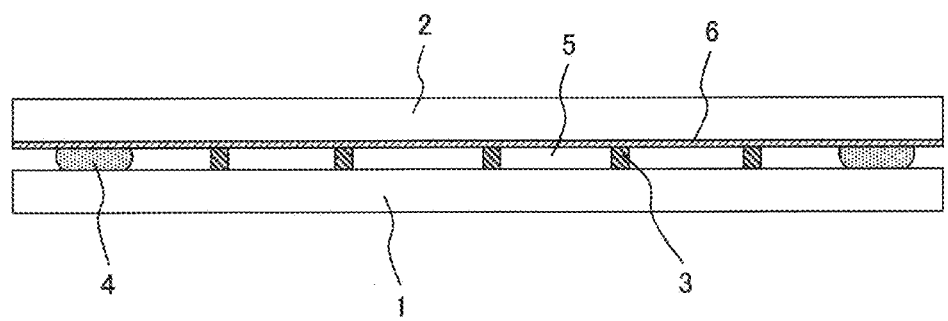
FIG. 1B is a schematic cross sectional view of FIG. 1A.

FIG. 1A and FIG. 1B illustrate, respectively, a schematic perspective view and a schematic cross sectional view of a vacuum heat insulating multilayer glass panel developed to window glass for building materials, etc. as a typical example of the vacuum heat insulating member. In the vacuum heat insulating multilayer glass panel, a soda lime glass substrate is used generally for a first substrate 1 and a second substrate 2. Internal spaces 5 between the first substrate 1 and the second substrate 2 is formed by a plurality of spacers 3, and the peripheral part of the internal space 5 is airtightly sealed by a sealing material 4 including a low-melting glass. The internal space 5 defined between the two substrates is evacuated. The vacuum state referred to in the present text is defined as a state of a space in which the pressure is lower than the atmospheric pressure.

In a vacuum heat insulating multilayer glass panel applied to window glass for building materials, a heat reflecting film 6 is generally formed on the inner surface of the second substrate 2.

However, further improvement in the vacuum degree of the internal space 5 was made difficult by gases released from the low-melting glass contained in the sealing material 4 upon airtight sealing, particularly, by releasing of a $CO_2$ gas. As a result, this makes it difficult to further improve the heat insulating property of the vacuum heat insulating multilayer glass panel. Then, the present inventors have studied vacuum heat insulating member capable of suppressing the release of gases from the sealing material 4.

Figure 2A:
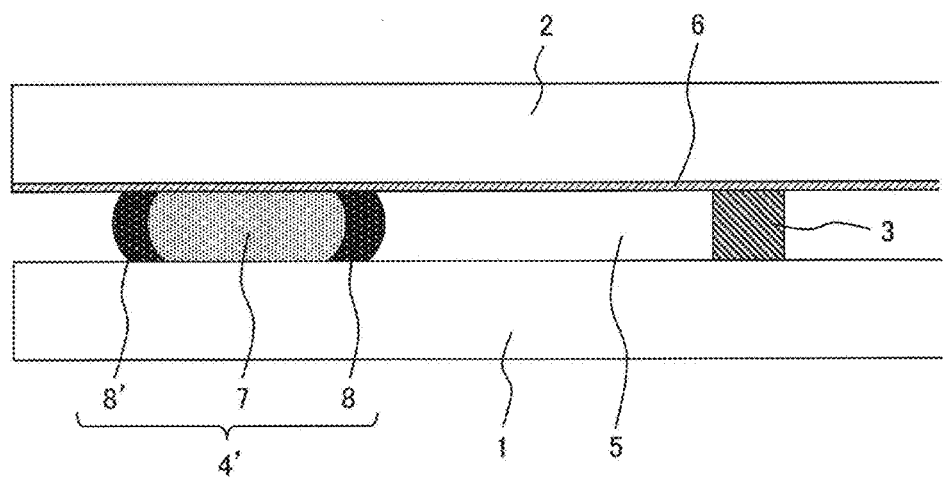
FIG. 2A is a schematic cross sectional view near a sealing part of a vacuum heat insulating member according to a preferred embodiment of the present invention.
Figure 2B:
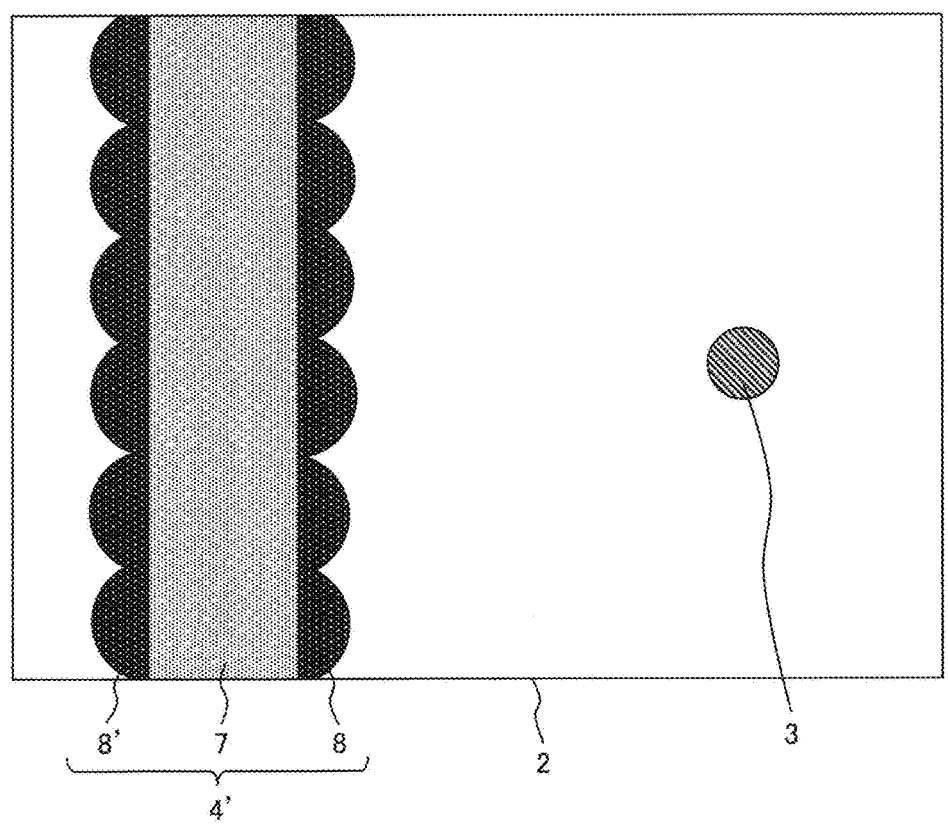
FIG. 2B is a schematic upper plan view of FIG. 2A.

FIG. 2A shows a schematic cross sectional view near a sealing part of the vacuum heat insulating member according to an embodiment of the present invention and FIG. 2B illustrates a schematic upper plan view of the sealing part. The vacuum heat insulating member includes the first substrate 1, a second substrate 2 disposed so as to face the first substrate 1 by way of a space 5, and a sealing part 4' disposed at the peripheral part of the internal space formed between the first substrate 1 and the second substrate 2. The sealing part 4' includes a glass phase 7 and a metal phase 8 formed on a side of the internal space 5 of the glass phase 7. A heat reflecting film 6 is formed to the second substrate 2. The internal space 5 is defined by a plurality of spacers 3 in the same manner as in FIG. 1. In addition, the spacer 3 may be single. Since the sealing part has the metal phase 8 disposed on the side of the internal space 5 of the glass phase 7, an exposed area of the glass phase 7 to the internal space 5 can be decreased and the amount of the $CO_2$ gas released from the low-melting glass to the internal space 5 can be decreased. As a result, the vacuum degree in the internal space 5 can be improved and the heat insulating property of the vacuum heat insulating multilayer glass panel can be improved. In view of the production method of the vacuum heat insulating member, the metal phase 8' is often formed in the sealing part 4' also on the outside of the glass phase 7. Details are to be described later. It may suffice that the metal phase is formed at least on the side of the internal space 5 of the glass phase 7.

In addition, the sealing part 4' is disposed at a peripheral part of the vacuum heat insulating member, and separates the internal space 5 (a closed space) and the outside of the vacuum heat insulating member. Therefore, the sealing part 4' can be called "a sealed part" of the vacuum heat insulating member.

(Sealing Part)

The sealing part 4' contains at least the glass phase 7 and the metal phase 8 formed on the side of the internal space 5 of the glass phase 7. Further, in a case where the metal phases are formed on both sides of the glass phase 7, the metal phase 8 is formed preferably in a greater amount on the side of the internal space than the metal phase 8' formed on the outer side.

The glass phase 7 is preferably a lead-free low-melting glass including vanadium oxide and tellurium oxide. This is because the lead-free low-melting glass containing vanadium oxide and tellurium oxide has a low softening point and can provide airtight sealing at a low temperature. In addition, the lead-free low-melting glass preferably further contains silver oxide. A lead-free glass further containing silver oxide in addition to vanadium oxide and tellurium oxide has a further lower softening point. Accordingly, airtight sealing can be applied at a lower temperature. In the present text, the low-melting glass means glass having a softening point of 400° C. or lower.

Further, the total amount of $V_2O_5$ and $TeO_2$ in the low-melting glass is preferably 55 mol % or more and 80 mol % or less. In a case of further containing $Ag_2O$, the total amount of $V_2O_5$, $TeO_2$ and $Ag_2O$ is preferably 80 mol % or more and 98 mol % or less. The lead-free low-melting glass may contain one of $P_2O_5$, $Fe_2O_3$, BaO, $WO_3$, ZnO, $Y_2O_3$ and $La_2O_3$. Such components are contained preferably by 2 mol % or more and 30 mol % or less.

The proportion of the glass phase 7 in the sealing part 4' is preferably 30 vol % or more and 60 vol % or less. At the proportion of the glass phase 7 within this range, preferred airtightness and joining strength tend to be obtainable.

The metal phase 8 forming the sealing part 4' is preferably a lead-free low-melting metal. The lead-free low-melting metal preferably contains tin. Further, the lead-free low-melting material preferably contains at least one of silver, copper, zinc, and antimony in addition to tin. In the present text, the low-melting metal means a metal having a melting point of 300° C. or lower.

The proportion of the metal phases 8, 8' in the sealing part 4' is preferably 20 vol % or more and 70 vol % or less. Within the range of the proportion of the metal phases 8, 8', preferred heat insulating property and joining strength trend to be obtainable.

Further, the sealing part 4' preferably contains low thermal expansion filler particles. Incorporation of the low thermal expansion filler particles can decrease the thermal expansion difference between the sealing part 4' and the substrates 1 and 2, to obtain a sealing part of higher joining strength. The low-thermal expansion filler particles are present preferably in the glass phase 7 than in the metal phase 8 of the sealing part 4'. The low-thermal expansion filler particles are preferably those having a negative thermal expansion coefficient. The low-thermal expansion filler particles having the negative thermal expansion coefficient preferably include zirconium tungstate phosphate ($Zr_2(WO_4)(PO_4)_2$). This is because zirconium tungstate phosphate has good wettability with lead-free low-melting glass containing vanadium oxide and tellurium oxide.

The blending ratio of the low thermal expansion filler particles in the sealing part 4' is preferably 10 vol % or more and 35 vol % or less. The blending ratio of the low thermal expansion filler particles within the range described above provides a feature that preferred airtightness and joining strength tend to be compatible.

Figure 3A:
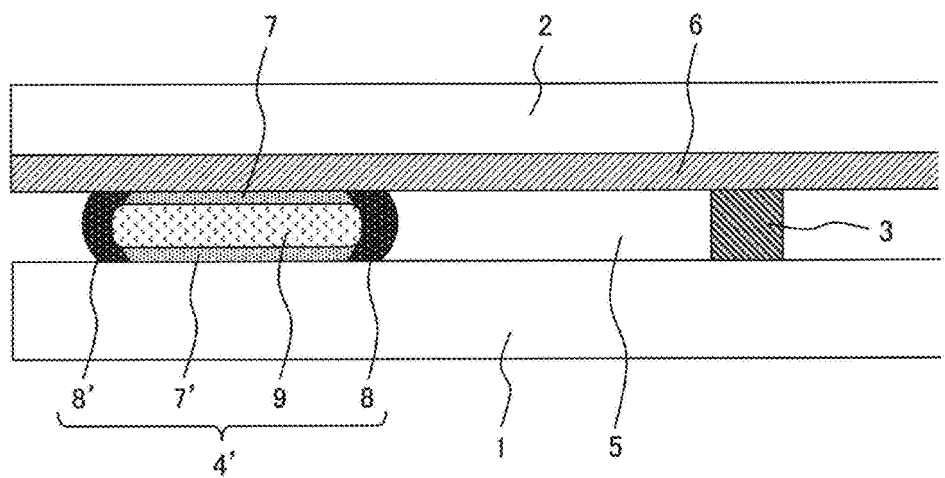
FIG. 3A is a schematic cross sectional view near a sealing part of a vacuum heat insulating member according to a preferred embodiment of the present invention.
Figure 3B:
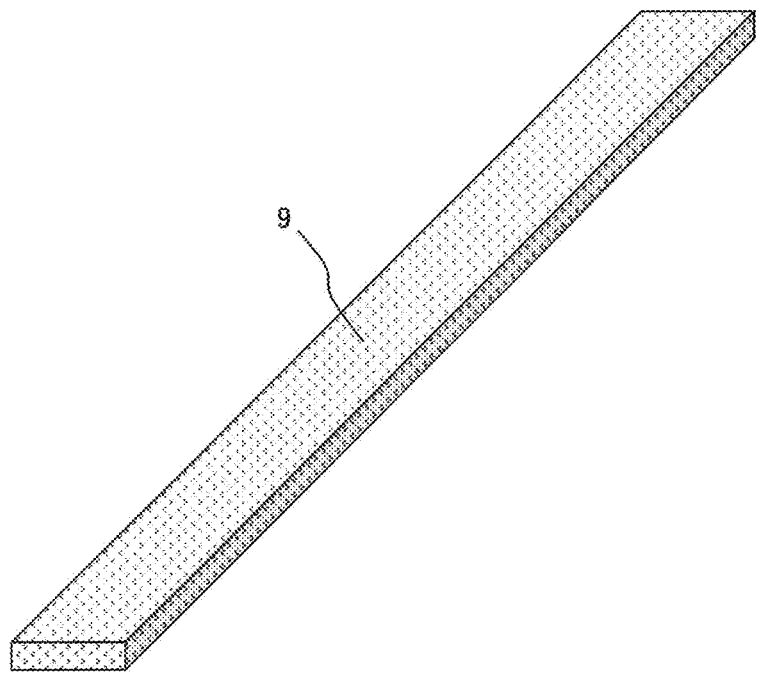
FIG. 3B is a schematic perspective view of a ribbon-shaped metal foil used for the vacuum heat insulating member of FIG. 3A.

Further, the sealing part 4' preferably has a ribbon-shaped metal foil. FIG. 3A is a schematic view of the sealing part including the ribbon-shaped metal foil. FIG. 3B is a perspective view of a metal foil 9 used for the sealing part 4'. The sealing part 4' includes glass phases 7, 7', metal phase 8, 8', and the metal foil 9, in which the first substrate 1 and the second substrate 2 are joined by glass phases 7, 7' by way of the ribbon-shaped metal foil 9. That is, the glass phases 7, 7' are disposed on both surfaces of the metal foil 9. Since the sealing part 4' has the metal foil 9, the amount of the low-melting glass used for the sealing part 4' can be decreased. This can remarkably decrease the amount of a $CO_2$ gas released from the low-melting glass. By decrease in the emission amount of the $CO_2$ gas and with the metal phase 8 disposed on the side of the internal space 5, the vacuum degree in the internal space 5 can be improved further, and the thermal insulating property of the vacuum heat insulating multilayer glass panel can be improved further. Further, since the lead-free low-melting glass containing vanadium oxide, tellurium oxide, and silver oxide is extremely expensive, decrease in the amount of the glass to be used is advantageous also in view of the cost reduction.

The ribbon-shaped metal foil 9 is preferably one of an iron-nickel series alloy, an iron-nickel-chromium series alloy, an aluminum metal, an aluminum series alloy, and a clad material thereof. In the metal foil 9 including the iron-nickel series alloy or the iron-nickel-chromium series alloy, since the thermal expansion can be matched easily with the glass substrate such as of soda-lime glass when the latter is used to the first substrate 1 or the second substrate 2, the joining strength of the sealing part 4' can be improved.

Further, since the metal foil 9 including the aluminum metal or the aluminum series alloy, the wettability and the bondability with the glass phases 7, 7' including lead-free low-melting glass containing vanadium oxide and tellurium oxide and, further, lead-free low-melting glass further containing silver oxide therein, airtightness in the sealing part 4' can be improved.

Figure 4A:
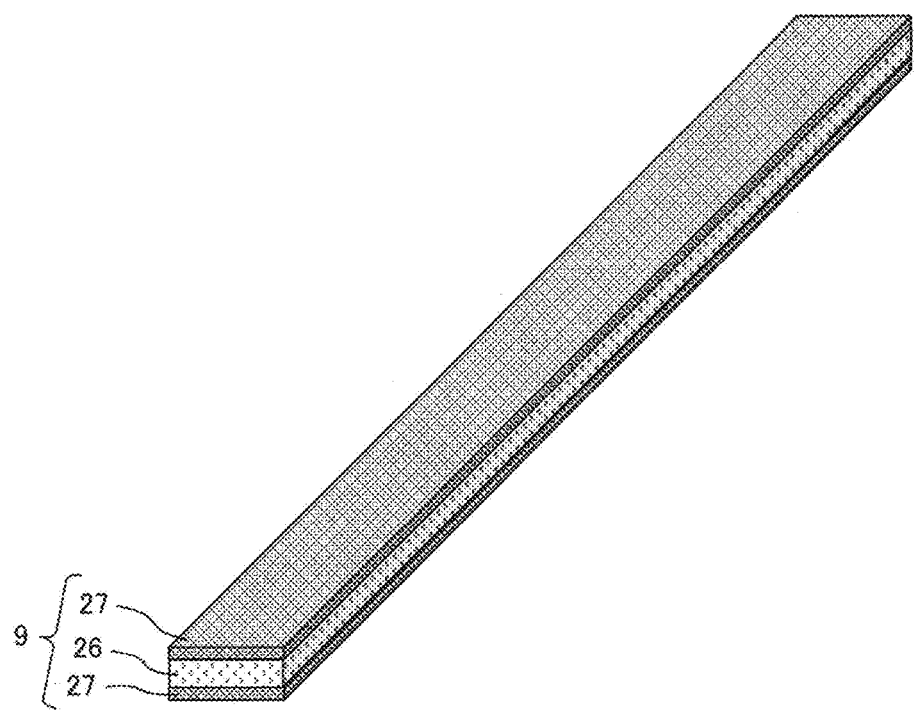
FIG. 4A is a schematic perspective view of a ribbon-shaped metal foil (a clad material)
Figure 4B:
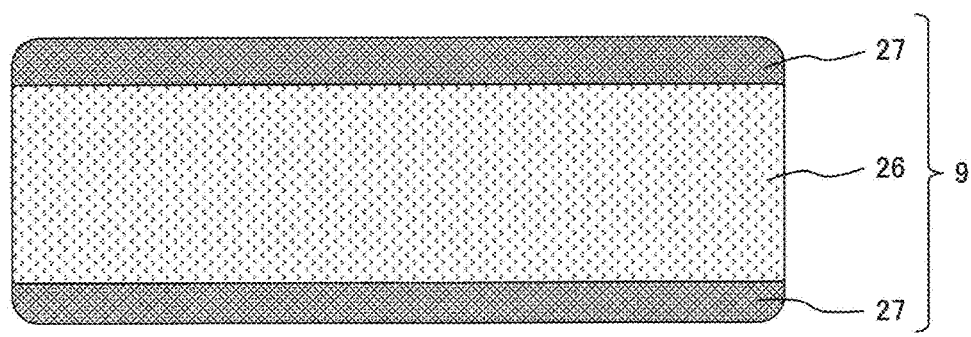
FIG. 4B is a schematic cross sectional view of FIG. 4A.

A particularly effective metal foil 9 is a clad material of an iron-nickel series alloy or an iron-nickel-chromium series alloy and an aluminum metal or an aluminum series alloy as shown in FIG. 4A and FIG. 4B. In the clad material shown in FIG. 4A and FIG. 4B, a layer 27 of the aluminum metal or the aluminum series alloy is formed on both surfaces of a ribbon-foil 26 (a base foil) including an iron-nickel series alloy or an iron-nickel-chromium series alloy, by which a sealing part of higher reliability can be obtained.

Figure 5A:
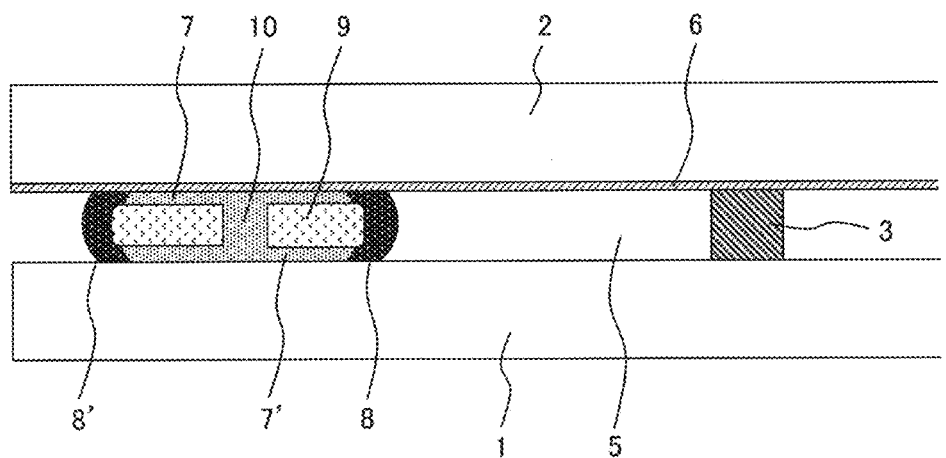
FIG. 5A is a schematic cross sectional view near a sealing part of a vacuum heat insulating member according to a preferred embodiment of the present invention.
Figure 5B:
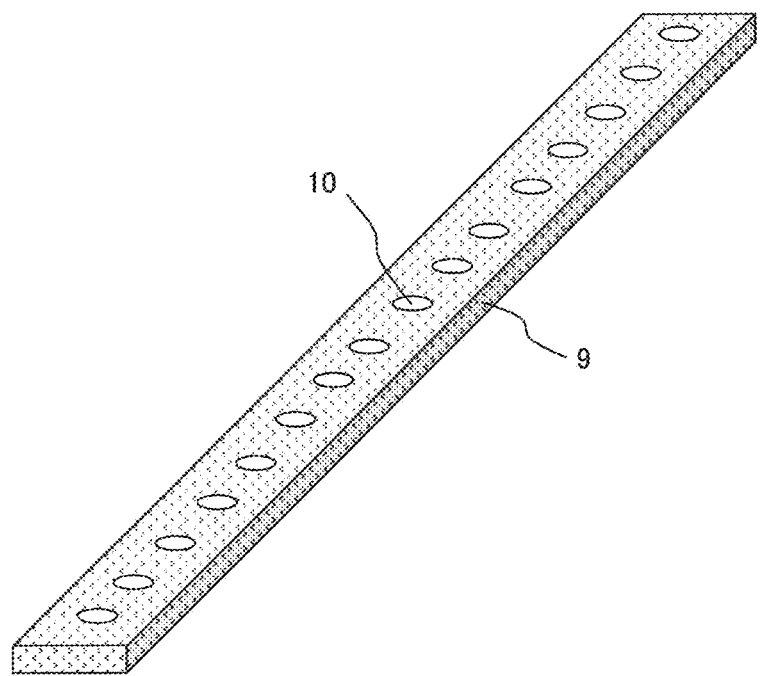
FIG. 5B is a schematic perspective view of a ribbon-shaped metal foil used for the vacuum heat insulating member of FIG. 5A.

Further, the metal foil 9 preferably has a plurality of through holes 10 as shown in FIG. 5A and FIG. 5B in which the glass phases 7, 7' are present in the through holes 10. Undulation is present somewhat in the first substrate 1 and the second substrate 2 and, when the through holes 10 are formed in the metal foil 9, a sealing material tend to flow back and forth by way of the through holes 10 and it is possible to decrease the failure in the airtight sealing caused by undulation of the first substrate 1 and the second substrate 2, and the production yield of the vacuum heat insulating member can be improved.

(First Substrate and Second Substrate)

The materials for the first substrate and the second substrate constituting the vacuum heat insulating member are not particularly restricted and it is preferred that at least one of the first substrate 1 and the second substrate 2 is a glass substrate. Since the glass substrate is transparent, has high airtightness and chemical stability, and has low thermal conductivity, it is effective to apply the glass substrate to the first substrate 1 or the second substrate 2. Further, use of inexpensive sola-lime glass for the glass substrate is preferred for general application and spread of the vacuum heat insulating member, particularly, window glass for building materials such as vacuum heat insulating multilayer glass panels.

Tempered glass subjected to thermal tempering or chemical tempering can be used to the glass substrate in order to prevent breakage caused by high evacuation for the internal space 5 and for security, prime prevention, etc. A vacuum heat insulating member according to a preferred embodiment of the present invention can be sealed airtightly at such a temperature range as not eliminating the surface compression tempered layer of the tempered glass, that is, at a temperature of about 320° C. or lower.

<Sealing Material>

Figure 6A:
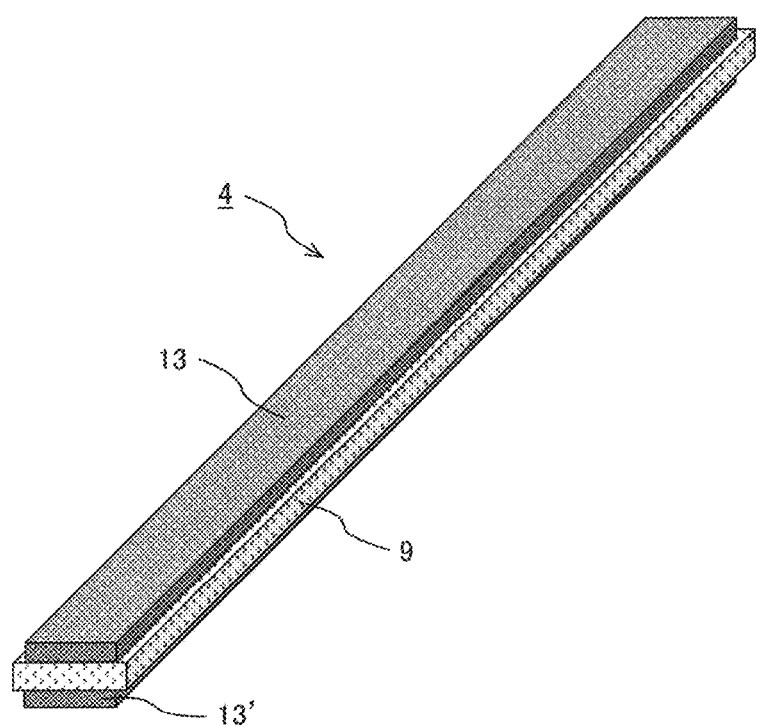
FIG. 6A is a schematic perspective view of a sealing material according to a preferred embodiment of the present invention.
Figure 6B:
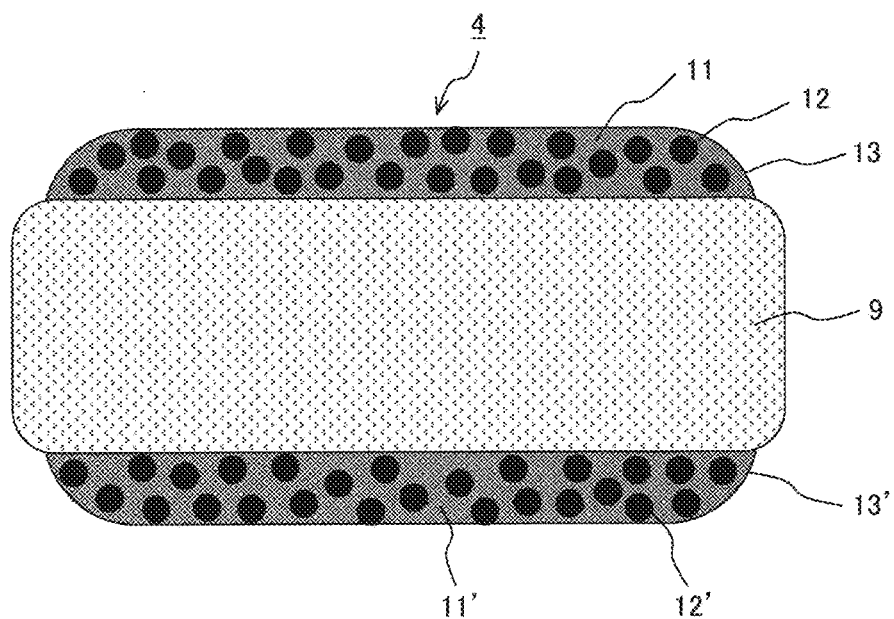
FIG. 6B is a schematic cross sectional view of FIG. 6A.

FIG. 6A and FIG. 6B are a schematic perspective view and a schematic cross sectional view of a sealing material according to a preferred embodiment of the present invention.

The sealing material 4 includes a ribbon-shaped metal foil 9 and coatings 13, 13' formed on both surfaces of the metal foil 9. The coatings 13, 13' include lead-free low-melting glass 11, 11' containing vanadium oxide and tellurium oxide, and lead-free low-melting metals 12, 12' containing metal tin. The coating containing the lead-free low-melting glass and the lead-free low-melting metal may be disposed not only on both surfaces of the metal foil but also on the lateral sides of the metal foil.

FIG. 7 shows a schematic view for the production method of the sealing material 4 shown in FIG. 6A and FIG. 6B.

FIG. 7 is merely an example of a production method for the sealing material 4 and the sealing material 4 can be produced continuously, which is advantageous in view of mass production.

As shown in FIG. 7, a paste including particles of lead-free low-melting glass 11, 11', particles of lead-free low-melting metal 12, 12' and a solvent is prepared at first. The prepared paste is coated on both surfaces of the metal foil 9 by using rollers, etc. (S10). Then, the paste-coated metal foil 9 is dried with a warm blow (S20). Successively, coatings 13, 13' are formed on both surfaces of the metal foil by baking at a temperature higher than the softening point of the lead-free low-melting glass 11, 11' (S30). Subsequently, they are cooled by air quenching (S40) and cut by using laser or the like (S50). Then, the sealing material 4 shown in FIG. 6 is prepared.

While the details are to be described later, the number of steps can be decreased and the capital investment can also be saved by manufacturing the vacuum heat insulating member by using the sealing material. As a result, the vacuum heat insulating member shown in FIGS. 3A and 3B (vacuum heat insulating multilayer glass panel) can be provided at a reduced cost.

(Ribbon-shaped Metal Foil)

In the sealing material 4, the metal foil 9 is preferably one of an iron-nickel series alloy, an iron-nickel-chromium series alloy, an aluminum metal, an aluminum series alloy, and a clad material thereof. When the glass substrate such as sola-lime glass, etc. is used for the first substrate 1 or the second substrate 2, the metal foil 9 including the iron-nickel series alloy and the iron-nickel-chromium series alloy tends to facilitate matching of thermal expansion with the substrate. Accordingly, the joining strength of the sealing part in the vacuum heat insulating member shown in FIGS. 3A and 3B (vacuum heat insulating multilayer glass panel) can be improved.

Further, since the metal foil 9 of the iron-nickel series alloy and the iron-nickel-chromium series alloy is attracted to a magnet, the sealing material 4 can be transported, disposed, and fixed by using a magnet. Accordingly, productivity or mass productivity of the vacuum heat insulating member (vacuum heat insulating multilayer glass panel) shown in FIGS. 3A and 3B can be improved.

Since the metal foil 9 including the aluminum metal and the aluminum series alloy has preferred wettability and bodability with the lead-free low-melting glass containing vanadium oxide and tellurium oxide, the airtightness of the sealing part in the vacuum heat insulating member (vacuum heat insulating multilayer glass panel) shown in FIGS. 3A and 3B can be improved.

Among them, a particularly effective metal foil 9 is a clad material in which a layer 27 of an aluminum metal or an aluminum series alloy layer is formed on both surfaces of a ribbon foil 26 including an iron-nickel series alloy or an iron-nickel-chromium series alloy shown in FIGS. 4A and 4B. Advantages of both of them can be utilized effectively. As a result, productivity and mass productivity can be improved in the vacuum heat insulating member (vacuum heat insulating multilayer glass panel) shown in FIGS. 3A and 3B and, in addition, a sealing part of high reliability can be obtained.

Figure 8A:
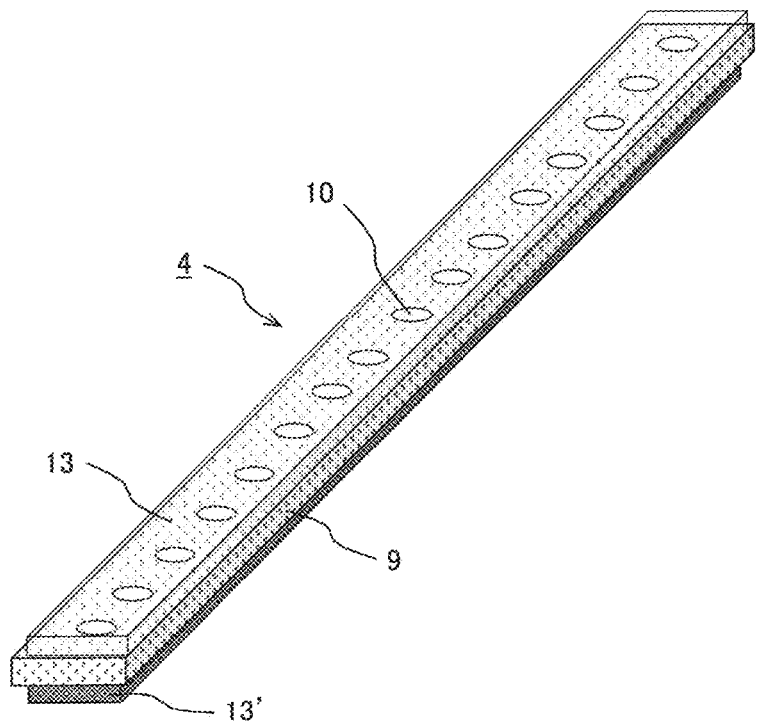
FIG. 8A is a schematic perspective view of a sealing material according to a preferred embodiment of the present invention.
Figure 8B:
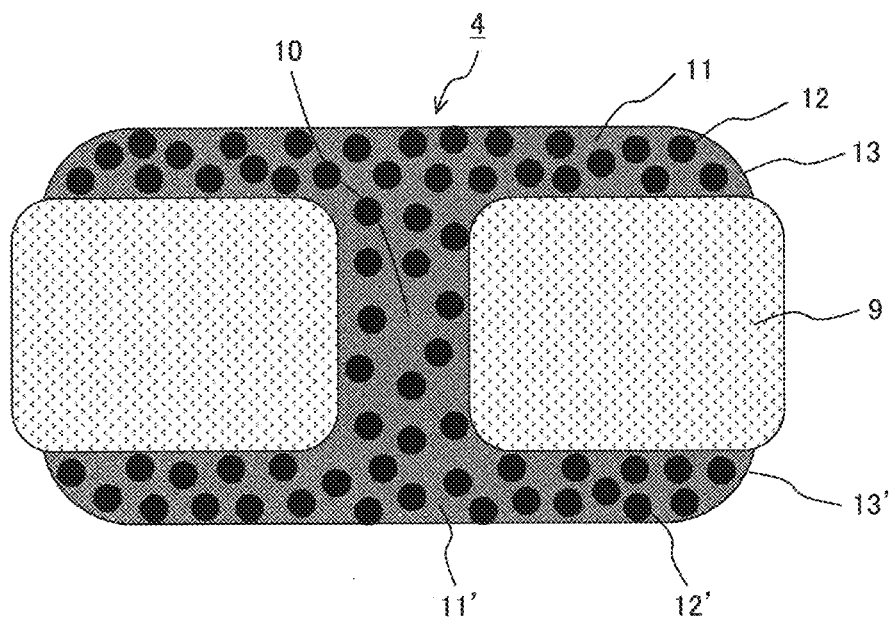
FIG. 8B is a schematic perspective view of FIG. 8A.

Further, the metal foil 9 preferably has a plurality of through holes 10. FIG. 8A shows a schematic perspective view and FIG. 8B shows a schematic cross sectional view of a ribbon-shaped metal foil formed with a plurality of through holes 10. Lead-free low-melting glass 11, 11' and lead-free low-melting metal 12, 12' are present in the through holes 10. The sealing material shown in FIG. 8A and FIG. 8B can be manufactured by the production method as shown in FIG. 7. By providing the through holes 10 to the metal foil 9, the lead-free low-melting glass 11, 11' and the lead-free low-melting metal 12, 12' can easily flow back and forth through the through holes 10 upon airtight sealing of the vacuum heat insulating member, and failure of airtight sealing caused by undulation of the substrate 1 or substrate 2 used for the vacuum heat insulating member can be decreased to improve the production yield of the vacuum heat insulating member.

The thickness of the metal foil 9 is preferably in a range of 0.10 mm or more and 0.25 mm or less while depending on the vacuum degree of the internal space 5. Further, it is preferably smaller by 20 μm or more than the height of the spacer 3. The width of the metal foil 9 is preferably in a range of 2 mm or more and 10 mm or less while depending on the size or the weight of the vacuum heat insulating member. As the size and the weight of the vacuum heat insulating member are larger, it becomes necessary that the width of the metal foil 9 is also larger for ensuring the joining strength of the sealing part 4'. The proportion of the metal foil 9 in the sealing material 4 or in the sealing part 4' is preferably 60 vol % or more and 90 vol % or less.

The diameter of the through hole 10 formed in the metal foil 9 is preferably about 0.1 mm or more and 1.0 mm or less, the distance between them is preferably about 3 mm or more and 10 mm or less, and the position of the through hole 10 is preferably near the lateral center of the metal foil 9.

(Coating)

The coatings 13, 13' constituting the sealing material 4 includes a lead-free low-melting glass containing vanadium oxide and tellurium oxide, and a lead-free low-melting metal containing tin. The lead-free low-melting glass preferably further contains silver oxide. By incorporation of silver oxide, the softening point of the glass can be lowered making it possible for sealing at lower temperature.

A preferred compositional range of the lead-free low-melting glass, in terms of oxide described below, is 20 mol % or more and 45 mol % or less of $V_2O_5$, 25 mol % or more and 45 mol % or less of $TeO_2$, and 0 mol % or more and 45 mol % or less of $Ag_2O$. In a case where $Ag_2O$ is not contained, the total amount of $V_2O_5$ and $TeO_2$ is preferably 55 mol % or more and 80 mol % or less. In a case where $Ag_2O$ is contained, the total amount of $V_2O_5$, $TeO_2$ and $Ag_2O$ is preferably 80 mol % or more and 98 vol % or less. The lead-free low-melting glass may also contain one of $P_2O_5$, $Fe_2O_3$, BaO, $WO_3$, ZnO, $Y_2O_3$ and $La_2O_3$ and the components are preferably 2 mol % or more and 30 mol % or less in total.

The proportion of the glass phase 7 in the coatings 13, 13' is preferably 30 vol % or more and 50 vol % or less. Preferred airtightness and joining strength can be obtained within the range of the proportion of the glass phase 7.

The lead-free low-melting metal further contains preferably at least one of silver, copper, zinc and antimony. Among them, it is particularly preferred to contain silver. When silver is contained in the lead-free low-melting metal, formation of high melting $Ag_3Sn$ by the reaction between tin and the $V_2O_5$—$TeO_2$—$Ag_2O$ series lead-free low-melting glass can be suppressed. When the forming amount of the lead-free low-melting metal increase, the metal less melts at a low temperature and satisfactory airtightness and heat insulating property can no more be obtained.

The proportion of the metal phases 8, 8' in the coatings 13, 13' is preferably 25 vol % or more and 50 vol % or less. Within the range of the proportion of the metal failures 8, 8', satisfactory heat insulating property and joining strength tend to be obtainable.

The process cost for the vacuum heat insulating member can be decreased greatly by airtight sealing at a lower temperature. As a result, an inexpensive vacuum heat insulating member can be provided. Further, tempered glass subjected to thermal tempering or chemical tempering can be applied to the first substrate 1 or the second substrate 2 by airtight sealing at lower temperature, specifically, at a temperature of 320° C. or lower. This can provide a vacuum heat insulating member capable of coping with breakage prevention caused by high evacuation of the internal space 5 and for security and clime prevention.

When silver oxide is incorporated in the lead-free low-melting glass and silver is incorporated in the lead-free low-melting metal, the material cost becomes expensive. However, since the metal foil 9 is used for the sealing material shown in FIGS. 6A, 6B and FIGS. 8A, 8B, the amount of the lead-free low-melting glass and the lead-free low-melting metal to be used can be decreased remarkably and the material cost can be prevented from increasing.

Further, the coating preferably contains low thermal expansion filler particles. Incorporation of the low thermal expansion filler particles can decrease the difference of thermal expansion with the first substrate 1 or the second substrate 2, specifically, with the glass substrate such as of soda-lime glass or tempered glass thereof and a sealing part of higher joining strength can be obtained. The low thermal expansion filler particles are preferably zirconium tungstate phosphate: $Zr_2(WO_4)(PO_4)_2$ having good wettability with the lead-free low-melting glass and having a negative thermal expansion coefficient.

The blending ratio of the low thermal expansion filler particles in the coatings 13, 13' is preferably 10 vol % or more and 30 vol % or less. When the blending ratio of the low thermal expansion filler particles is within the range described above, this provide a feature that preferred airtightness and joining strength are easily compatible.

<Production Method of Vacuum Heat Insulating Member>

The production method of the vacuum heat insulating member includes a first step of transporting and disposing the sealing material 4 shown in FIG. 6A, 6B or FIG. 8A, 8B by using a magnet to the peripheral part of the first substrate 1 where the plurality of spacer 3 are arranged, a second step of disposing and fixing a second substrate 2 over the sealing material 4 such that it faces the first substrate 1 by way of a space 16, and a third step of heating the fixed first substrate 1 and the second substrate 2 in vacuum and airtightly sealing the peripheral part by the sealing material 4.

Figure 9A:
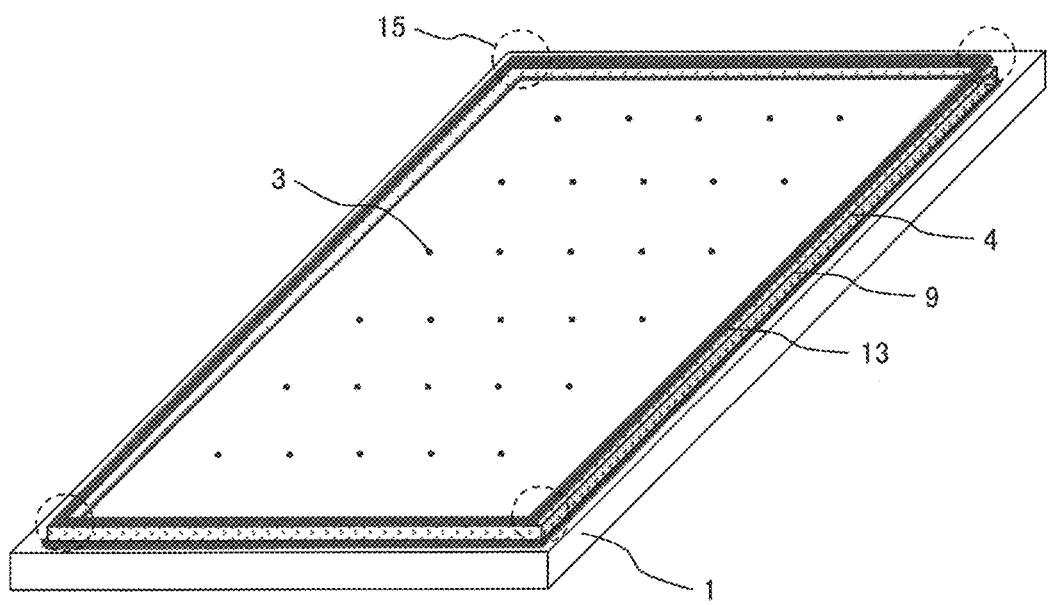
FIG. 9A is a schematic view explaining a production method (a first step) of the vacuum heat insulating member of FIG. 3A and FIG. 5A.
Figure 9B:
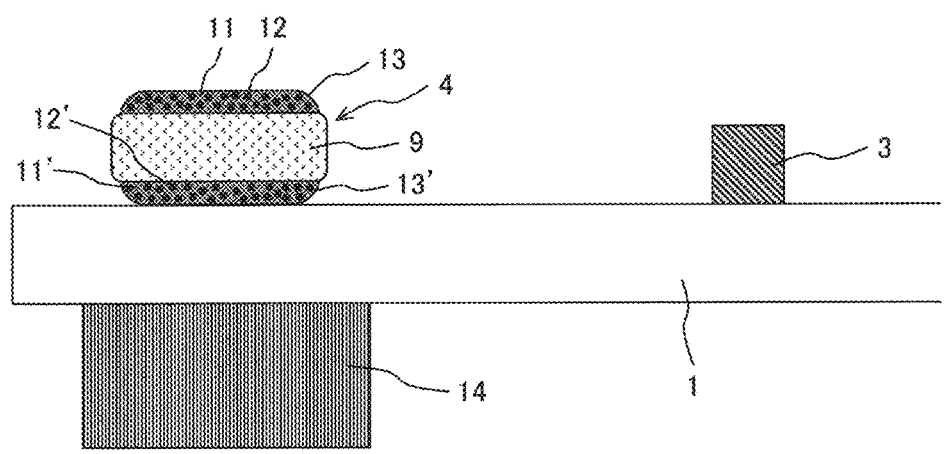
FIG. 9B is a schematic cross sectional view for a peripheral part of FIG. 9A.

FIG. 9A to FIG. 11B show the schematic views for the production method of the vacuum heat insulating member shown in FIGS. 3A, 3B and FIGS. 5A, 5B. The production method of the vacuum heat insulating member is to be explained for a vacuum heat insulating multilayer glass panel as a typical example of the vacuum heat insulating member. FIG. 9A is a schematic perspective view explaining the first step and FIG. 9B is a schematic view for the peripheral part of the vacuum heat insulating member in the first step.

The sealing material 4 shown in FIGS. 6A, 6B, FIGS. 8A, 8B is disposed by using a magnet 14 to the peripheral part of the first substrate 1 to which a plurality of spacers 3 are arranged. The magnet 14 may be either a permanent magnet or an electromagnet. Since the metal foil 9 of the sealing material 4 is attracted to the magnet 14, the sealing material 4 can be disposed easily to a predetermined peripheral part by using the magnet. Further, also at an edge portion 15 (see FIG. 12A) of the sealing material 4 disposed to the peripheral part of the substrate 1, sealing materials can be disposed by the magnet 14 in contact each other with no large gap between the sealing materials 4.

Figure 10A:
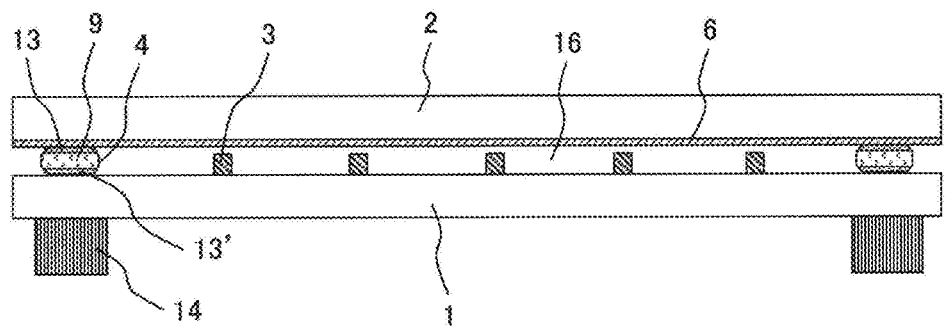
FIG. 10A is a schematic view explaining the production method (a second step) of the vacuum heat insulating member of FIG. 3A and FIG. 5A.
Figure 10B:
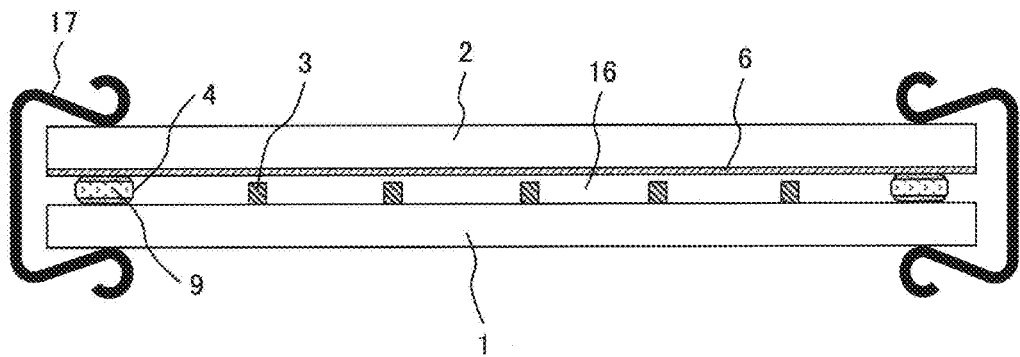
FIG. 10B is a schematic view explaining the production method (the second step) of the vacuum heat insulating member of FIG. 3A and FIG. 5A.

FIG. 10A and FIG. 10B are schematic cross sectional views for explaining the second step. A second substrate 2 having a heat reflecting film 6 (an antireflection film) formed on the sealing material 4 is disposed by a magnet 14 so as to face the first substrate 1 by way of a space 16 and is fixed by a heat resistant clip 17, or the like. The magnet 14 is detached after fixing by the heat resistant clip 17, or the like.

Figure 11A:
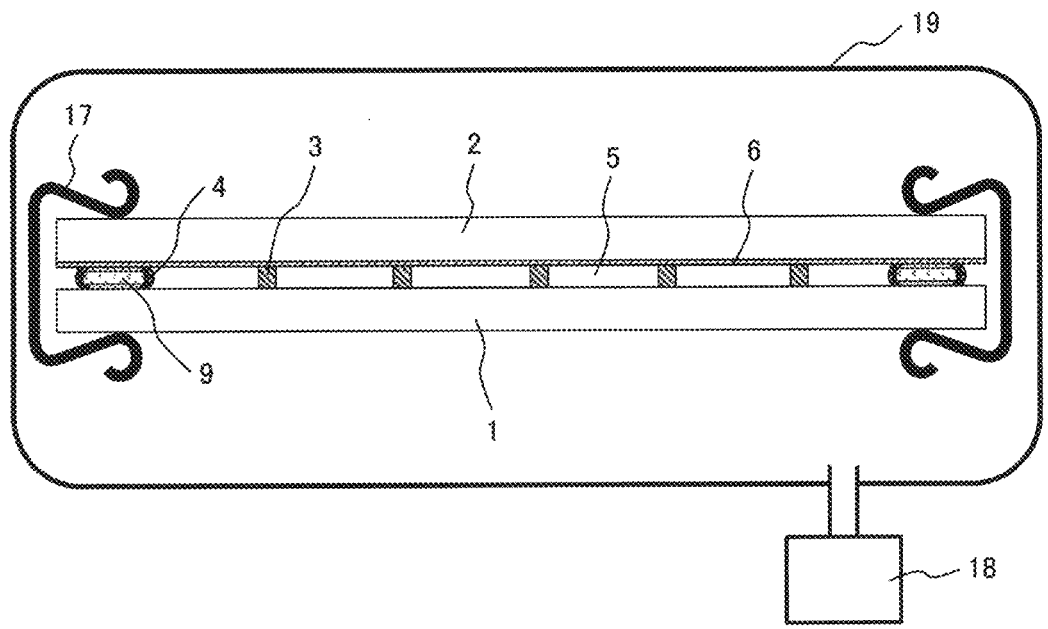
FIG. 11A is a schematic view explaining the production method (a third step) of the vacuum heat insulating member of FIG. 3A and FIG. 5A.
Figure 11B:
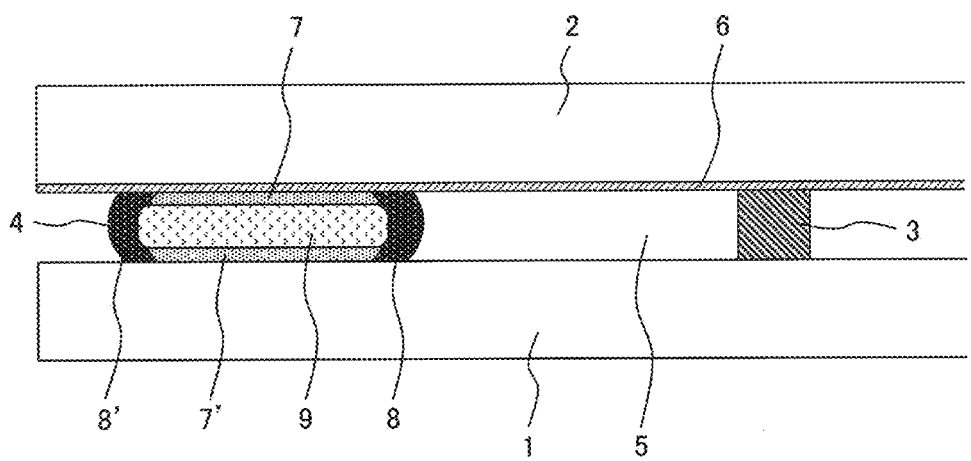
FIG. 11B is a schematic cross sectional view near a sealing part of FIG. 11A.

FIG. 11A is a view for explaining the third step. FIG. 11B is a schematic cross sectional view near the sealing part in the third step. The first substrate 1 and the second substrate 2 fixed by the heat resistant clip 17 are disposed inside a vacuum heating furnace 19 connected with a vacuum pump 18, and heated while evacuation. The peripheral part is airtightly sealed by the sealing material 4 by heating while evacuation. Upon vacuum heating, the lead-free low-melting glass contained in the sealing material 4 softens to fluidize. Further, the lead-free low-melting metal also melts and the vacuum heat insulating member (vacuum heat insulating multilayer glass panel) having a cross sectional sealing structure as shown in FIGS. 3A, 3B, FIGS. 5A, 5B and FIGS. 11A, 11B can be obtained by further pressurization at the heat resistant clip 17 and the loading of the substrate 2. That is, the glass phases 7, 7' including lead-free low-melting glass 11, 11' and the metal phases 8. 8' including lead-free low-melting metals 12, 12' are formed in the sealing part between the first substrate 1 and the second substrate 2. The metal phases 8, 8' are often formed on both ends of the glass phases 7, 7', that is, on the side of the internal space 5 and on the outer side of the internal space 5. In a case where the vacuum degree of the internal space 5 is high, the metal phase 8 on the side of the internal space 5 increases and, on the other hand, the metal phase 8' on the outer side thereof is decreased or eliminated. In this opposite case, the vacuum degree of the internal space 5 is low, and satisfactory heat insulating property cannot sometimes be obtained for the vacuum heat insulating member.

In the production method of the vacuum heat insulating member (vacuum heat insulating multilayer glass panel), three or more substrates may be used to make a multilayered panel.

Further, the vacuum heat insulating member having an exhaust hole in the substrate can be manufactured by the following method. The method includes a first step of transporting and disposing the sealing material 4 shown in FIGS. 6A, 6B and FIGS. 8A, 8B by using a magnet to the peripheral part of the first substrate 1 having an exhaust hole 20 and an exhaust pipe 21 in which a plurality of spacers 3 are arranged, a second step of disposing and fixing a second substrate 2 over the sealing material 4 so as to face the first substrate 1 by way of a space 16, a third step of heating the internal space 16 between the fixed first substrate 1 and the second substrate 2 while evacuation and exhaustion by an exhaust hole 20 and an exhaust pipe 21 and airtightly sealing the peripheral part by the sealing material 4, and a fourth step of burning-out the exhaust pipe 21 during or after cooling by a heater or a burner.

In addition, the first substrate 1 may not include the exhaust pipe 21. That is, the first substrate 1 may include the exhaust hole 20 and may have a structure of inserting the other exhaust pipe to the exhaust hole 20. In this case, the other exhaust pipe may be pulled off, and the fourth step of burning-out the exhaust pipe 21 is not necessary.

The production method is to be described with reference to FIG. 12A to FIG. 15B. FIG. 12A to FIG. 15B are schematic views for explaining each of the steps of the production method of the vacuum heat insulating multilayer glass panel as a typical example of the vacuum heat insulating member.

Figure 12A:
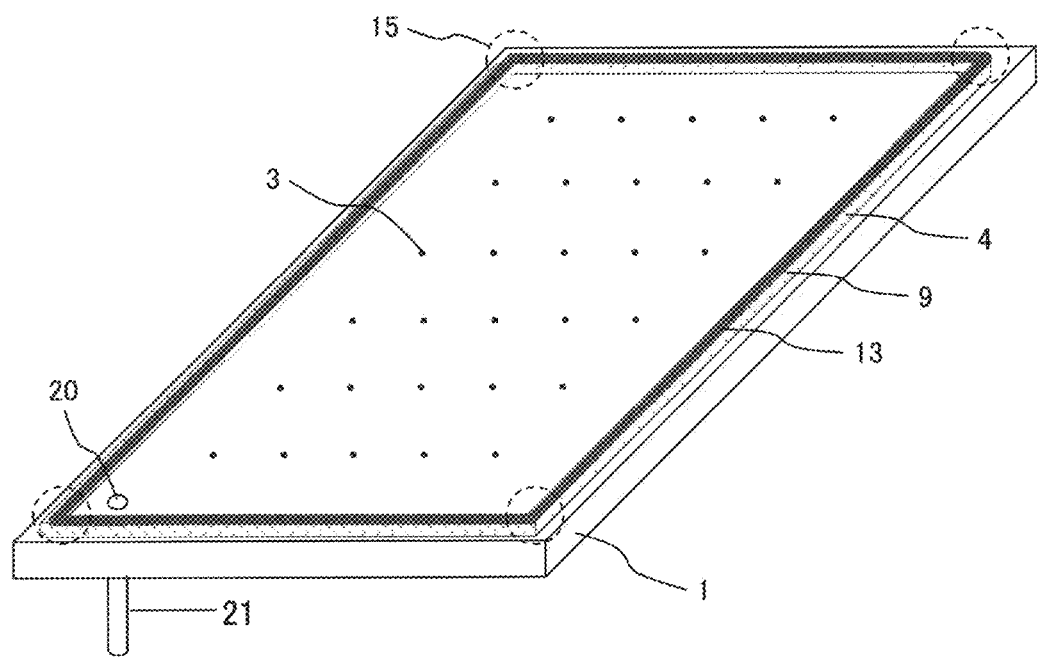
FIG. 12A is a schematic view explaining a production method (a first step) of the vacuum heat insulating member (using an exhaust pipe arranged on a first substrate) of FIG. 3A and FIG. 5A.
Figure 12B:
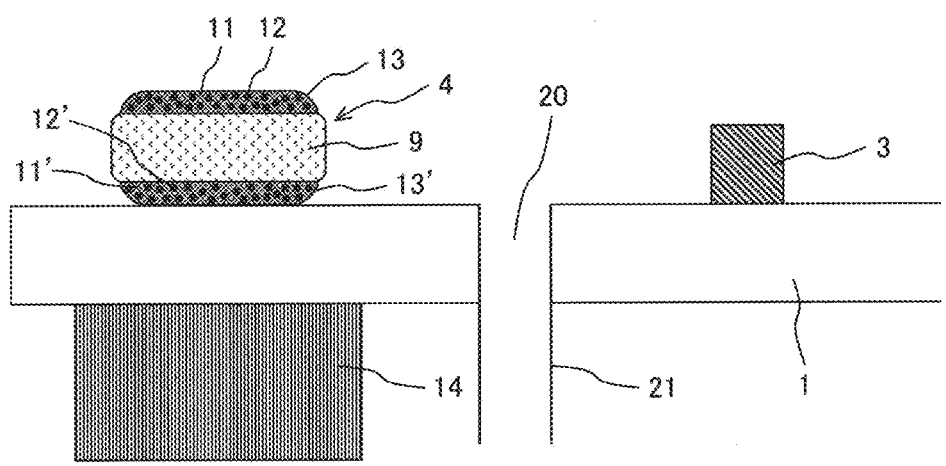
FIG. 12B is a schematic cross sectional view at a peripheral part of FIG. 12A.

FIG. 12A is a schematic view explaining the first step and FIG. 12B is a cross sectional view of a peripheral part of the first substrate 1 in the first step. First, the sealing material 4 shown in FIGS. 6A, 6B or FIGS. 8A, 8B is disposed by using the magnet 14 to the peripheral part of the first substrate 1 having an exhaust hole 20 and an exhaust pipe 21, and having a plurality of spacers 3 arranged therein.

Figure 13A:
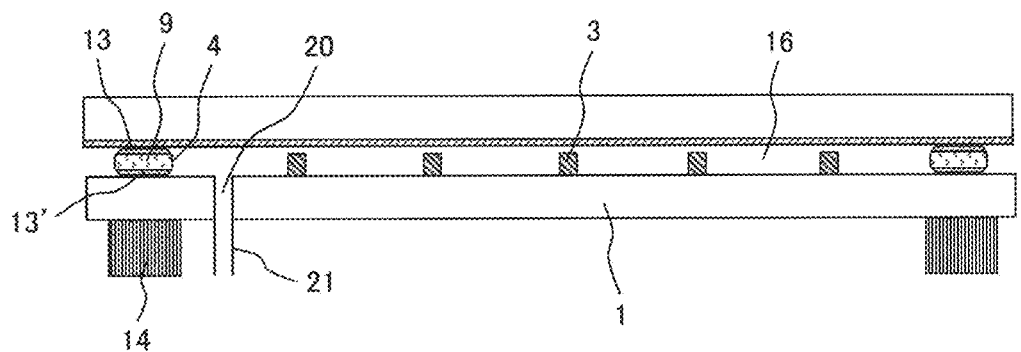
FIG. 13A is a schematic view explaining the production method (a second step) of the vacuum heat insulating member (using the exhaust pipe arranged on the first substrate) of FIG. 3A and FIG. 5A.
Figure 13B:
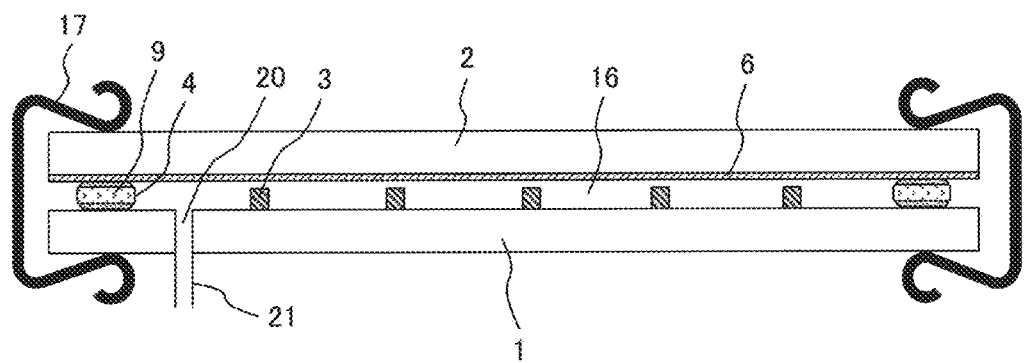
FIG. 13B is a schematic view explaining the production method (the second step) of the vacuum heat insulating member (using the exhaust pipe arranged on the first substrate) of FIG. 3A and FIG. 5A.

FIG. 13A and FIG. 13B are schematic views explaining the second step.

A second substrate 2 formed with a heat reflecting film 6 is disposed from above the sealing material 4 as shown in FIG. 13A so as to face the first substrate 1 by way of a space 16. After fixing the same by a heat resistant clip 17 as shown in FIG. 13B, the magnet 14 is detached.

Figure 14A:
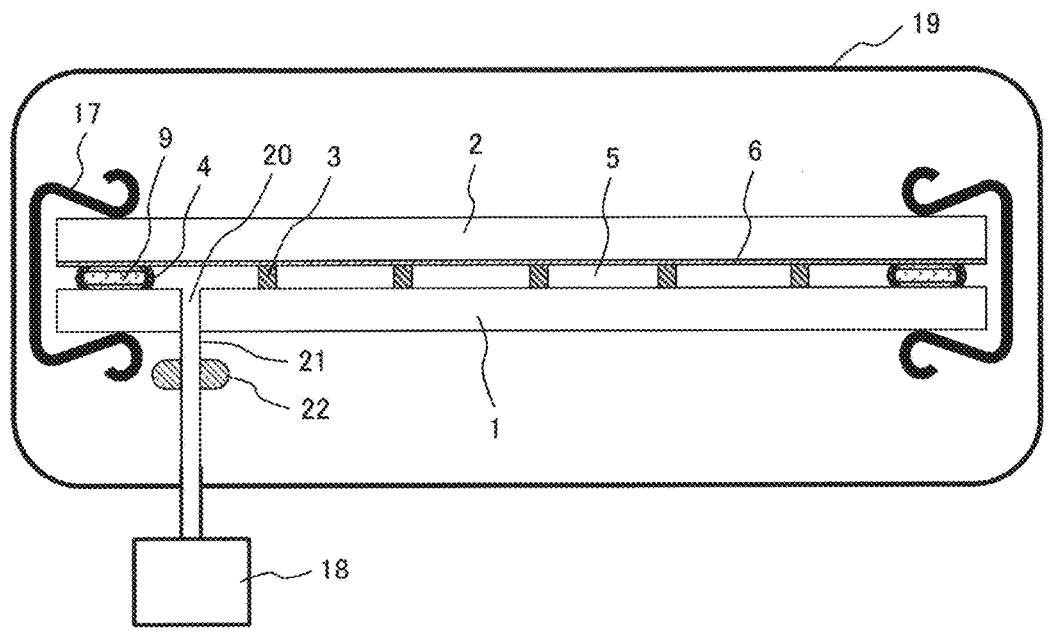
FIG. 14A is a schematic view explaining the production method (a third step) of the vacuum heat insulating member (using the exhaust pipe arranged on the first substrate) of FIG. 3A and FIG. 5A.
Figure 14B:
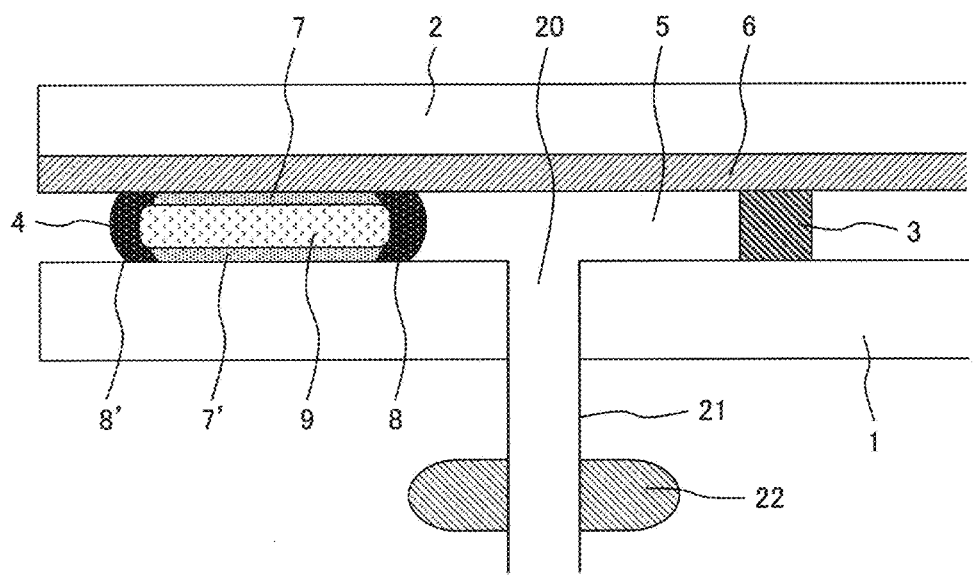
FIG. 14B is a schematic cross sectional view near a sealing part of FIG. 14A.

FIG. 14A is a schematic view for explaining a third step. FIG. 14B is an enlarged view near the sealing part in the third step. The first substrate and the second substrate fixed by the heat resistant clip 17 are disposed inside a vacuum heating furnace 19 as shown in FIG. 14A. Further, an electric heater 22 is attached to an exhaust pipe 21, and the exhaust pipe 21 is connected to a vacuum pump 18. The space 16 between the substrate 1 and the substrate 2 is heated under evacuation from an exhaust hole 20 and an exhaust pipe 21. The peripheral part can be sealed airtightly by heating under evacuation to attain the vacuum state in the internal space 5.

Figure 15A:
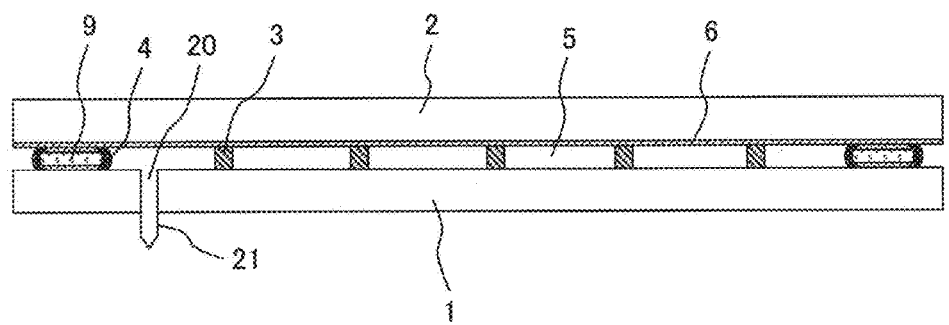
FIG. 15A is a schematic view explaining the production method (a fourth step) of the vacuum heat insulating member (using the exhaust pipe arranged on the first substrate) of FIG. 3A and FIG. 5A.
Figure 15B:
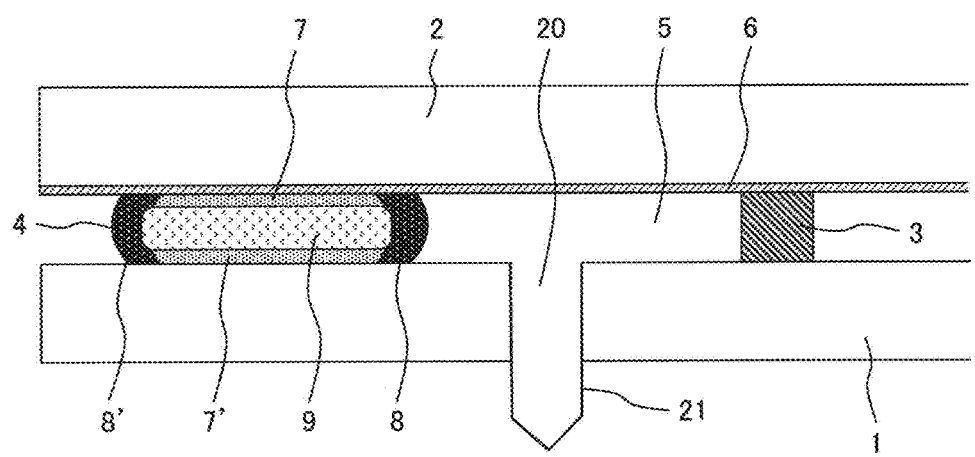
FIG. 15B is a schematic enlarged cross sectional view near a sealing part of FIG. 15A.

FIG. 15A is a schematic view for explaining the fourth step and FIG. 15B is an enlarged view near the sealing part in the fourth step. In the vacuum heat insulating member in which the internal space 5 is evacuated, the exhaust pipe 21 is burnt-off by an electric heater during or after cooling. By burning-off the exhaust pipe, the vacuum state of the internal space 5 can be maintained.

EXAMPLE

The present invention is to be described more specifically with reference to specific examples. However, the present invention is not restricted to the examples mentioned below but includes modified embodiments thereof.

Figure 16:
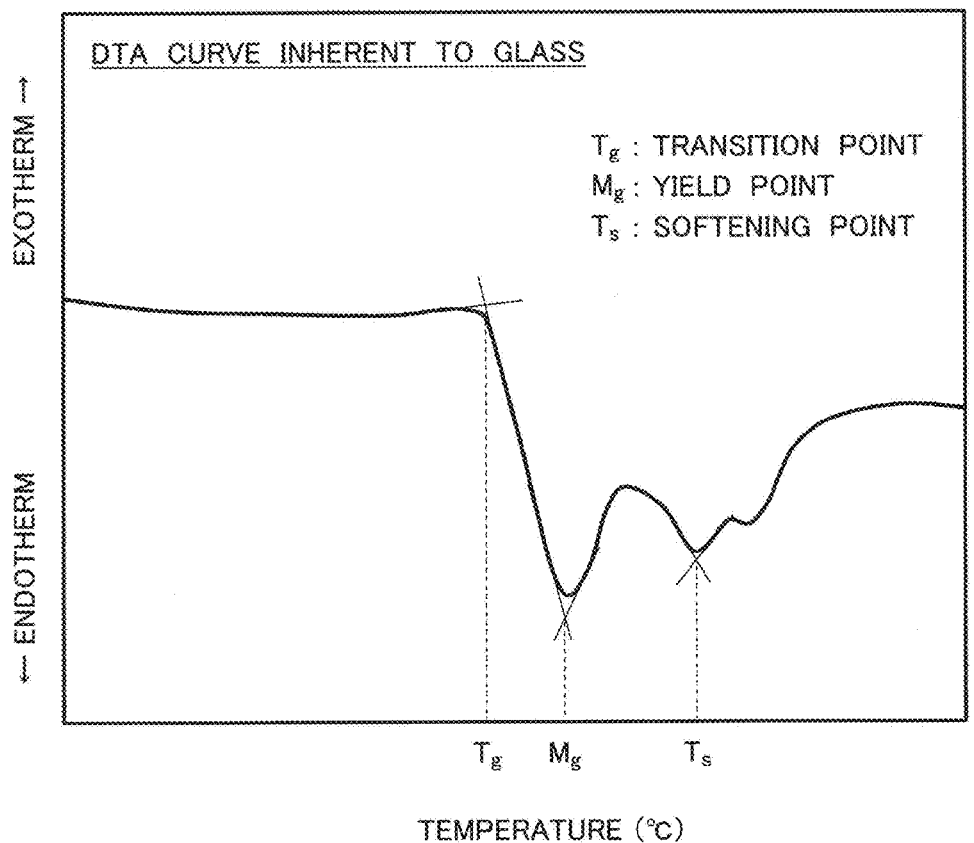
FIG. 16 shows an example of a typical curve of differential thermal analysis (DTA) inherent to a glass.

In the examples, lead-free low-melting glass, lead-free low-melting metal and low thermal expansion filler particles used for producing the sealing material of the vacuum heat insulating member in the examples are shown in Table 1, Table 2, and Table 3 respectively. Characteristic temperatures of the lead-free low-melting glass shown in Table 1 were measured by differential thermal analysis (DTA). An example of a typical DTA curve inherent to glass is shown in FIG. 16. In FIG. 16, the starting temperature for the first endothermic peak is a transition point $T_g$, the endothermic peak temperature thereof is a yield point $M_g$, and the second endothermic peak temperature is a softening point $T_s$, and the characteristic temperatures are generally determined by a tangential method. The respective characteristic temperatures are defined according to the viscosity of glass such that $T_g$ to $10^{13.3}$ poise, $M_g$ to $10^{11.0}$ poise, and $T_s$ to $10^{7.65}$ poise.

A vacuum heat insulating multilayer glass panel was produced by a sealing material including a combination of the lead-free low-melting glass in Table 1, the lead-free low-melting metal in Table 2, and the low thermal expansion filler particles in Table 3, and the heat insulating property thereof was evaluated. The sealing material was used in the form of a paste by blending and mixing the lead-free low-melting glass in Table 1, the lead-free low-melting metal in Table 2 and the low thermal expansion filler particles in Table 3 and adding a solvent or the like to blended mixture.

TABLE 1

| No. | Principal Component (mol %) | | | Subcomponent (mol %) | | | | | | | Density (g/cm³) | Characteristic Temperature (° C.) | | | Thermal Expansion Coefficient | |
|---|---|---|---|---|---|---|---|---|---|---|---|---|---|---|---|---|
| | $V_2O_5$ | $TeO_2$ | $Ag_2O$ | $P_2O_5$ | $Fe_2O_3$ | BaO | $WO_3$ | ZnO | $Y_2O_3$ | $La_2O_3$ | | Transition Point $T_g$ | Yield Point $M_g$ | Softening Point $T_s$ | $(\times 10^{-7}/$ ° C.$)$ | Temperature Range (° C.) |
| A-1 | 41.3 | 31.3 | — | 11.7 | 15.7 | — | — | — | — | — | 3.65 | 310 | 334 | 376 | 93 | 30~250 |
| A-2 | 43.0 | 31.4 | — | 15.2 | 10.4 | — | — | — | — | — | 3.58 | 294 | 319 | 358 | 102 | |
| A-3 | 43.5 | 31.6 | — | 11.8 | 7.4 | — | 3.6 | 2.1 | — | — | 3.69 | 281 | 308 | 353 | 102 | |
| A-4 | 37.8 | 32.3 | — | — | — | 22.4 | 7.5 | — | — | — | 4.39 | 284 | 303 | 334 | 149 | |
| A-5 | 37.9 | 37.8 | — | — | — | 16.9 | 7.4 | — | — | — | 4.43 | 283 | 285 | 325 | 141 | |
| A-6 | 25.5 | 34.5 | 20.0 | 6.0 | — | 6.0 | 8.0 | — | — | — | 5.11 | 241 | 264 | 307 | 152 | 30~150 |
| A-7 | 20.3 | 42.8 | 24.0 | — | — | 7.8 | 4.8 | — | — | 0.3 | 5.50 | 207 | 229 | 263 | 174 | |
| A-8 | 20.0 | 40.0 | 30.0 | — | — | — | 7.0 | — | — | 3.0 | 5.57 | 204 | 230 | 265 | 175 | |
| A-9 | 20.0 | 39.5 | 30.0 | — | — | 5.0 | 5.0 | — | — | 0.5 | 5.58 | 190 | 212 | 245 | 182 | |
| A-10 | 17.5 | 38.0 | 30.5 | 5.7 | 0.3 | 3.0 | 5.0 | — | — | — | 5.52 | 207 | 225 | 263 | 178 | |
| A-11 | 21.0 | 41.0 | 31.0 | — | — | — | 5.0 | — | — | 2.0 | 5.61 | 194 | 216 | 252 | 180 | |
| A-12 | 20.5 | 39.0 | 33.0 | — | — | — | 5.0 | — | 0.5 | 2.0 | 5.64 | 184 | 206 | 244 | 191 | |
| A-13 | 20.0 | 37.5 | 35.0 | — | — | 5.0 | 2.0 | — | — | 0.5 | 5.67 | 174 | 196 | 231 | 196 | |
| A-14 | 21.0 | 35.0 | 39.5 | — | — | 3.0 | 1.0 | — | — | 0.5 | 5.71 | 160 | 179 | 210 | 205 | 30~130 |
| A-15 | 21.0 | 35.0 | 40.0 | — | — | — | 3.0 | — | 0.5 | 0.5 | 5.73 | 161 | 176 | 209 | 198 | |
| A-16 | 23.0 | 29.5 | 43.5 | — | — | — | 3.0 | — | 1.0 | — | 5.75 | 158 | 175 | 204 | 202 | |
| A-17 | 22.5 | 28.0 | 45.0 | — | — | 3.0 | 1.0 | — | — | 0.5 | 5.78 | 147 | 165 | 193 | 210 | |
| A-18 | 23.0 | 30.0 | 45.0 | — | — | — | 1.0 | — | — | 1.0 | 5.81 | 148 | 161 | 190 | 208 | |

TABLE 2

| No. | Principal Component (mass %) | | Subcomponent (mass %) | | | Melting Point (° C.) | |
|---|---|---|---|---|---|---|---|
| | Sn | Ag | Cu | Zn | Sb | Solidus | Liquidus |
| B-1 | 100 | — | — | — | — | 232 | 232 |
| B-2 | 96.5 | 3.5 | — | — | — | 221 | 223 |
| B-3 | 96.5 | 3.0 | 0.5 | — | — | 217 | 220 |
| B-4 | 95.5 | 3.9 | 0.6 | — | — | 217 | 226 |
| B-5 | 99.25 | — | 0.75 | — | — | 227 | 229 |
| B-6 | 91.0 | — | — | 9.0 | — | 199 | 199 |
| B-7 | 95.0 | — | — | — | 5.0 | 240 | 243 |

TABLE 3

| No. | Low Thermal Expansion Filler Particle | Density (g/cm³) | Thermal Expansion Coefficient $(\times 10^{-7}/$ ° C.$)$ |
|---|---|---|---|
| C-1 | Zirconium Tungstate Phosphate $Zr_2(WO_4)(PO_4)_2$ | 3.8 | −32 |
| C-2 | Zirconium Tungstate Phosphate containing Trace Amount of Iron Tungstate $Zr_2(WO_4)(PO_4)_2$ containing Trace Amount of $FeWO_4$ | 3.8 | −30 |
| C-3 | Quartz Glass $SiO_2$ | 2.2 | 5 |
| C-4 | β-eucryptite $Li_2O\cdot Al_2O_3\cdot 2SiO_2$ | 2.4 | −60 |

TABLE 3-continued

| No. | Low Thermal Expansion Filler Particle | Density (g/cm$^3$) | Thermal Expansion Coefficient (×10$^{-7}$/° C.) |
|---|---|---|---|
| C-5 | Cordierits 2MgO•2Al$_2$O$_3$•5SiO$_2$ | 2.5 | 1 |

Example 1

In Example 1, a vacuum heat insulating member shown in FIGS. 2A, 2B was manufactured by a sealing material using a lead-free low-melting glass in Table 1 and a lead-free low-melting metal in Table 2, and a heat insulating property thereof was evaluated. Further, as a comparative example, the vacuum heat insulating member shown in FIG. 1 was manufactured by a sealing material using the lead-free low-melting glass shown in Table 1 and the low thermal expansion filler particles shown in Table 3 and the heat insulating property thereof was also evaluated. The sealing material was used in the form of a paste by adding a solvent, etc. both for the example and the comparative example.

(Preparation of Sealing Material)

A paste of a sealing material was prepared by using a powder of a lead-free low-melting glass in Table 1, a powder of a lead-free low-melting metal in Table 2, a solvent, etc. Further, for manufacturing a vacuum heat insulating member of a comparative example, a paste of a sealing material was prepared by using a powder of the lead-free low-melting glass in Table 1, low thermal expansion filler particles in Table 3, a solvent, etc. For the powder of the lead-free low-melting glass in Table 1, a pulverized powder of about 5 to 10 µm in average particle size was used. Further, for the powder of the lead-free low-melting metal in Table 2, an atomized powder in a range of 15 to 45 µm in average particle size was used. Further, for the low thermal expansion filler particles in Table 3, a pulverized powder or a spherical powder of about 10 to 20 µm in average particle size was used. Further, as the solvent for preparing the paste, butyl carbitol acetate was used in a case of containing the lead-free low-melting glass A-1 to 5, and α-terpineol as a high viscosity solvent was used in a case of containing A-6 to 18. Further, in a case where the lead-free low-melting glass A-1 to 5 was contained, a slight amount of a resin was also contained to control the viscosity of the paste. Ethyl cellulose was used for the resin.

Table 4 shows the type and the blending composition of the sealing material, that is, the type and the blending ratio of the lead-free low-melting glass and the lead-free low-melting metal used in the example, and an atmospheric baking temperature and a vacuum sealing temperature thereof. Further, Table 5 shows the type and the blending composition of the sealing material, that is, the type and the blending ratio of the lead-free low-melting glass and the low thermal expansion filler particle used in a comparative example, as well as atmospheric baking temperature and a vacuum sealing temperature thereof. The blending ratio of the lead-free low-melting glass and the lead-free low-melting metal in Table 4 used in the example was fixed to 30:70 by volume %. On the other hand, the blending ratio of the lead-free low-melting glass and the low-thermal expansion filler particle shown in Table 5 used for the comparative example was determined considering the thermal expansion of the soda-lime glass substrate used for the first substrate 1 and the second substrate 2.

The thermal expansion coefficient of the soda-lime glass substrate used was 88×10$^{-7}$/° C. in a temperature range of 30 to 300° C. On the contrary, in the sealing material used for the example, since the content of the lead-free low-melting metal is large and the lead-free low-melting metal is soft, remaining thermal stress tends to be moderated and needs no such consideration for the thermal expansion difference relative to the soda-lime glass substrate as in the case of the sealing material used for the comparative example. Further, the low thermal expansion filler particles C-4 and C-5 shown in Table 3 were also investigated but since any of the lead-free low-melting glass in Table 1 was crystallized failing to obtain satisfactory softening fluidity, they are not listed in Table 5.

(Preparation of Vacuum Heat Insulating Member)

A production method of the vacuum heat insulating member is to be explained with reference to FIGS. 17A to 19.

Figure 17A:
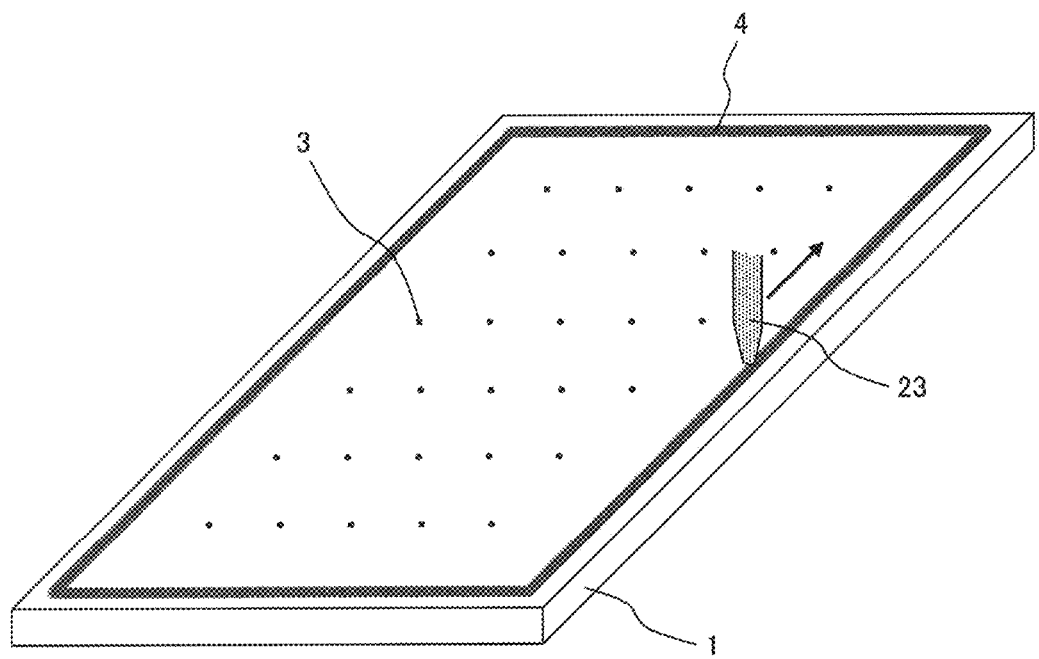
FIG. 17A is a schematic view explaining a production method of a vacuum heat insulating member according to Example 1.
Figure 17B:
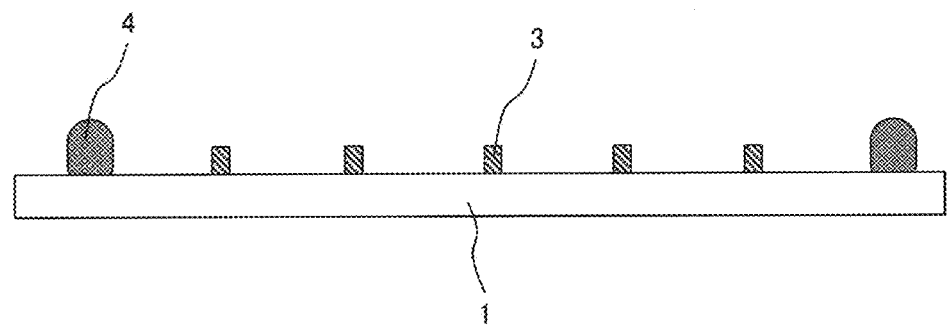
FIG. 17B is a schematic view explaining the production method of the vacuum heat insulating member according to Example 1.

As shown in FIG. 17A and FIG. 17B, a prepared paste of a sealing material 4 was coated by using a dispenser 23 along the peripheral part of a first substrate 1 having a plurality of spacers 3 arranged therein as illustrated in FIG. 17A and FIG. 17B, dried at about 150° C. for 30 mins and, subsequently, baked in atmospheric air. As the baking conditions, the temperature elevation rate was set to about 6° C./min, and the member was held for 30 minutes at a temperature higher by about 10 to 40° C. than the softening point T$_s$ of the lead-free low-melting glass contained in the sealing material 4 for 30 minutes.

Figure 18:
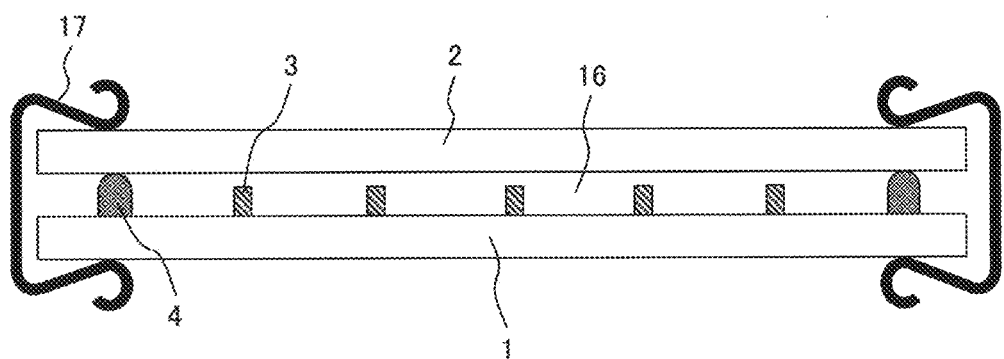
FIG. 18 is a schematic view explaining the production method of the vacuum heat insulating member according to Example 1.
Figure 19:
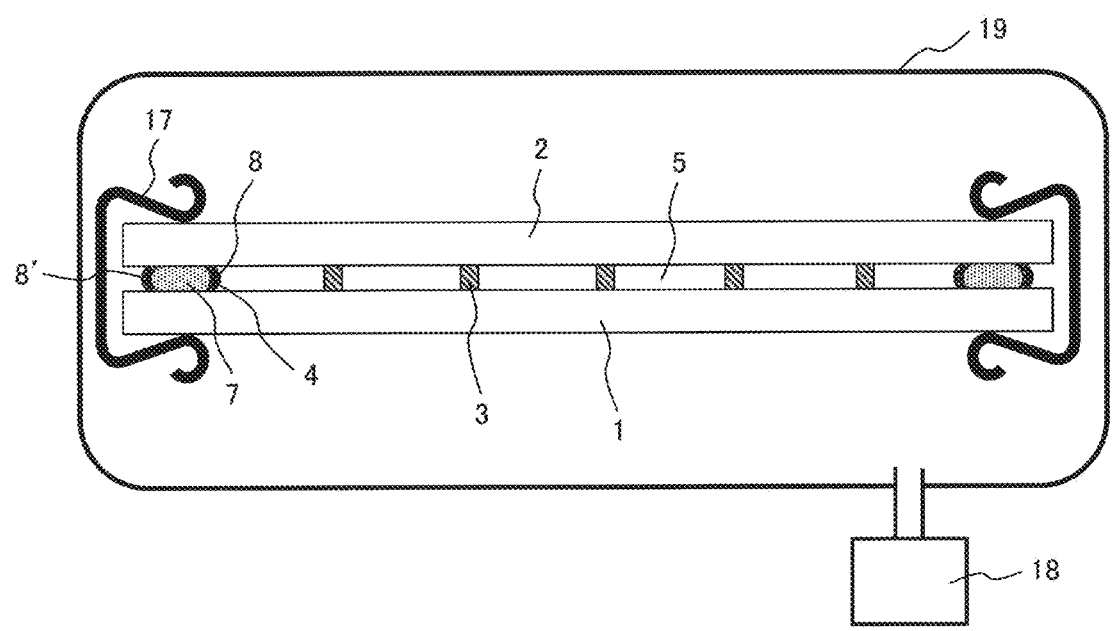
FIG. 19 is a schematic view explaining the production method of the vacuum heat insulating member according to Example 1.

Then, as shown in FIG. 18, a second substrate 2 was joined and fixed at a plurality of positions by clips 17. They were set inside a vacuum heating furnace 19 as shown in FIG. 19 and the peripheral part was airtightly sealed by heating under evacuation using a vacuum pump 18 to thereby manufacture a vacuum heat insulating member shown in FIG. 1. An infrared lamp was used for heating the vacuum heating furnace 19.

As the sealing conditions in the vacuum heating furnace 19, the temperature elevation rate was set to about 5° C./min and the member was maintained for 30 minutes at a temperature higher by about 5 to 30° C. than the softening point T$_s$ of the lead-free low-melting glass contained in the sealing material 4.

In this example, soda-lime glass substrate sized 250 mm×200 mm×3 mm was used both for the substrate 1 and the substrate 2 in which a heat reflecting film 6 was not formed to the substrate 2. Further, the height of the spacer 3 was set to 0.2 mm and an inner space 5 in a vacuum state was formed.

TABLE 4

| Example No. | Lead-Free Low-Melting Glass | | Lead-Free Low-Melting Metal | | Atmospheric Baking Temperature (° C.) | Vacuum Sealing Temperature (° C.) |
|---|---|---|---|---|---|---|
| | Type | Content [volume %] | Type | Content [volume %] | | |
| AB-1 | A-1 | 30 | B-1 | 70 | 410 | 390 |
| AB-2 | A-2 | 30 | B-5 | 70 | 395 | 375 |
| AB-3 | A-3 | 30 | B-7 | 70 | 390 | 370 |

TABLE 4-continued

| Example No. | Lead-Free Low-Melting Glass Type | Content [volume %] | Lead-Free Low-Melting Metal Type | Content [volume %] | Atmospheric Baking Temperature (° C.) | Vacuum Sealing Temperature (° C.) |
|---|---|---|---|---|---|---|
| AB-4  | A-4  | 30 | B-1 | 70 | 365 | 350 |
| AB-5  | A-5  | 30 | B-1 | 70 | 355 | 340 |
| AB-6  | A-6  | 30 | B-4 | 70 | 340 | 325 |
| AB-7  | A-7  | 30 | B-4 | 70 | 300 | 285 |
| AB-8  | A-8  | 30 | B-2 | 70 | 300 | 285 |
| AB-9  | A-9  | 30 | B-2 | 70 | 275 | 260 |
| AB-10 | A-10 | 30 | B-2 | 70 | 300 | 285 |
| AB-11 | A-11 | 30 | B-3 | 70 | 280 | 265 |
| AB-12 | A-12 | 30 | B-3 | 70 | 270 | 250 |
| AB-13 | A-13 | 30 | B-4 | 70 | 260 | 240 |
| AB-14 | A-14 | 30 | B-2 | 70 | 220 | 215 |
| AB-15 | A-15 | 30 | B-2 | 70 | 220 | 215 |
| AB-16 | A-16 | 30 | B-3 | 70 | 215 | 210 |
| AB-17 | A-17 | 30 | B-6 | 70 | 210 | 205 |
| AB-18 | A-18 | 30 | B-6 | 70 | 205 | 200 |

TABLE 5

| Comparative Example No. | Lead-Free Low-Melting Glass Type | Content [volume %] | Low Thermal Expansion Filler Particle Type | Content [volume %] | Atmospheric Baking Temperature (° C.) | Vacuum Sealing Temperature (° C.) |
|---|---|---|---|---|---|---|
| AC-1  | A-1  | 70 | C-3 | 30 | 410 | 390 |
| AC-2  | A-2  | 65 | C-3 | 35 | 395 | 375 |
| AC-3  | A-3  | 65 | C-3 | 35 | 390 | 370 |
| AC-4  | A-4  | 60 | C-1 | 40 | 365 | 350 |
| AC-5  | A-5  | 60 | C-2 | 40 | 355 | 340 |
| AC-6  | A-6  | 57 | C-2 | 43 | 340 | 325 |
| AC-7  | A-7  | 53 | C-1 | 47 | 300 | 285 |
| AC-8  | A-8  | 53 | C-1 | 47 | 300 | 285 |
| AC-9  | A-9  | 53 | C-1 | 47 | 275 | 260 |
| AC-10 | A-10 | 53 | C-1 | 47 | 300 | 285 |
| AC-11 | A-11 | 52 | C-1 | 48 | 280 | 265 |
| AC-12 | A-12 | 52 | C-1 | 48 | 270 | 250 |
| AC-13 | A-13 | 52 | C-1 | 48 | 260 | 240 |
| AC-14 | A-14 | 50 | C-1 | 50 | 220 | 215 |
| AC-15 | A-15 | 50 | C-1 | 50 | 220 | 215 |
| AC-16 | A-16 | 50 | C-1 | 50 | 215 | 210 |
| AC-17 | A-17 | 50 | C-1 | 50 | 210 | 205 |
| AC-18 | A-18 | 50 | C-1 | 50 | 205 | 200 |

(Evaluation for Heat Insulating Property)

Figure 20:
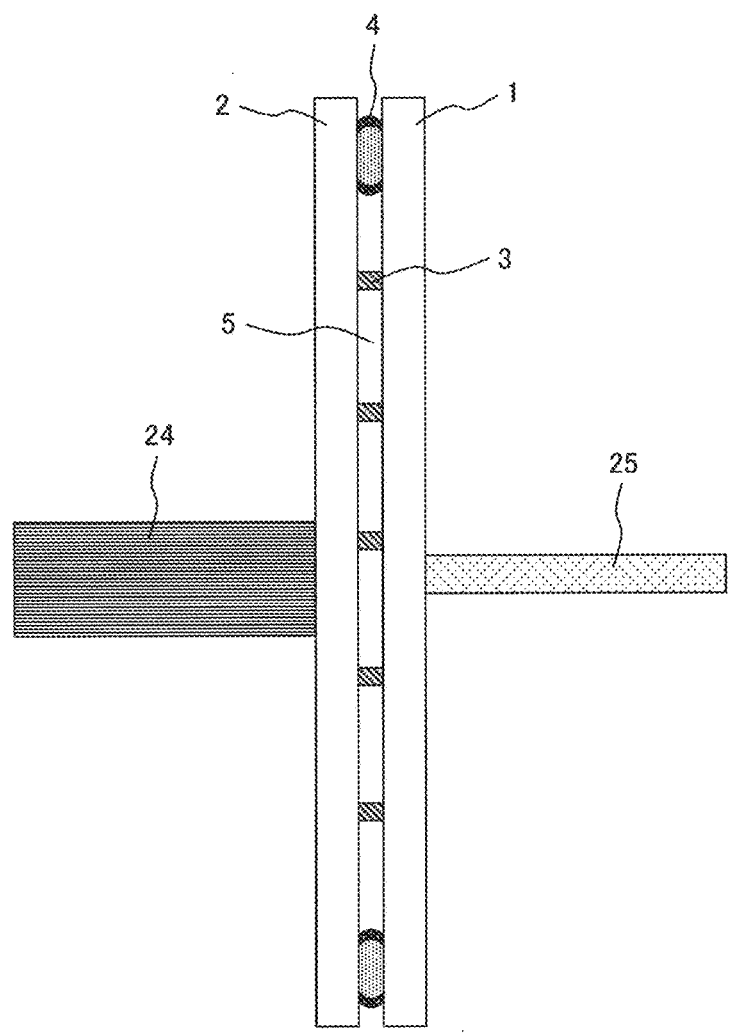
FIG. 20 is a schematic cross sectional view showing an evaluation method for a heat insulating property of vacuum heat insulating members produced in examples and comparative examples.

The prepared vacuum heat insulating member was evaluated for the heat insulating property. FIG. 20 is a view for explaining the evaluation method of the heat insulating property. In the evaluation for the heat insulating property of the manufactured vacuum heat insulating member, a cylindrical heater 24 of a 20 mm outer diameter heated and kept at 60° C. was in contact with the central portion on the surface of a substrate 2, and change of temperature for 20 minutes was measured by a thermometer 25 bonded at the central portion on the surface of the substrate 1 on the opposite side. As the temperature elevation rate was lower, it was judged that the vacuum degree of the internal space 5 was high and the heat insulating property was high.

Figure 21:
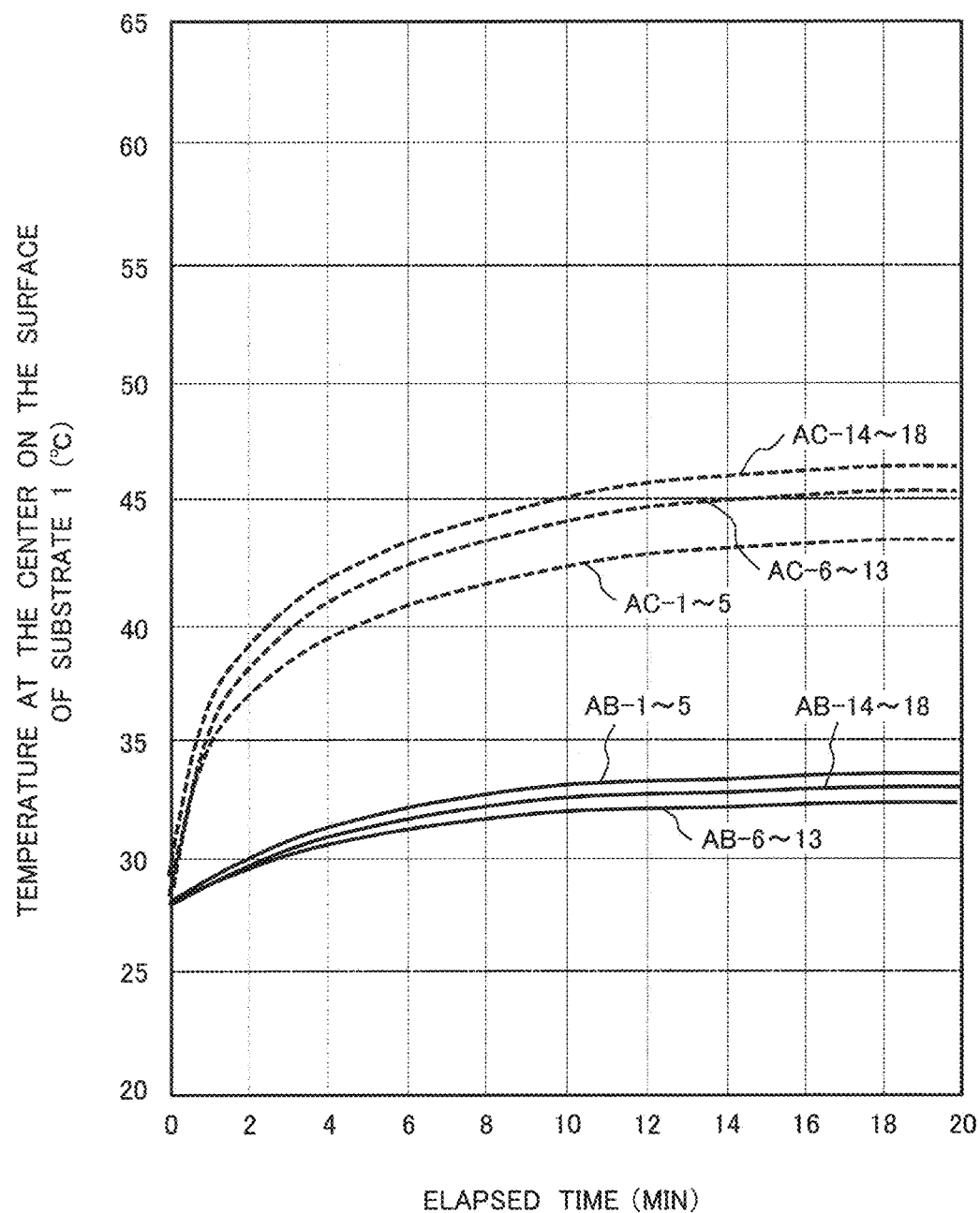
FIG. 21 is a graph showing a change of temperature with time at a central portion on one side of a vacuum heat insulating member of Example 1 when a central portion on the other side thereof is heated to 60° C.

FIG. 21 shows the result of evaluation for the heat insulating property of the manufactured vacuum heat insulating member of the example and the comparative example, that is, change of temperature with time at the central portion on the surface of the substrate 1 when the central portion on the surface of the substrate 2 was heated to 60° C. In the vacuum heat insulating member of the comparative example manufactured by using the sealing materials AC-1 to 18 in Table 5, the temperature at the central portion on the surface of the substrate 2 was elevated with lapse of time, and the change of temperature was substantially eliminated after 14 minutes or more. Similar trend of temperature elevation was observed for a group using the sealing materials AC-1 to 5, a group using AC-6 to 13, and a group using AC-14 to 18, respectively.

The vacuum heat insulating member of the comparative example showing the least temperature elevation was that of the group using the sealing materials AC-1 to 5. The temperature elevation is next to the least in the group using the sealing materials AC-6 to 13 and the vacuum heat insulating member showing the greatest temperature elevation was that of the group of using the sealing materials AC-14 to 18. It was found that there was a regularity in the trend for temperature elevation and the vacuum heat insulating member using a sealing material containing lead-free low-melting glass of high characteristic temperature and subjected to atmospheric baking or vacuum sealing at a higher temperature showed a trend of less surface temperature elevation of the substrate 1.

The lead-free low-melting glass A-1 to 5 of Table 1 contained in the sealing materials AC-1 to 5 were $V_2O_5$—$TeO_2$ series, which showed a higher characteristic temperature and a lower thermal expansion coefficient among the materials shown in Table 1. Further, the content of the lead-free low-melting glass A-1 to 5 in the sealing materials AC-1- to 5 was somewhat larger as shown in Table 5. On the other hand, the lead-free low-melting glass A-6 to 18 in Table 1 contained in the sealing materials AC-6 to 13 and AC-14 to 18 was $V_2O_5$—$TeO_2$—$Ag_2O$ series and the characteristic temperature was low due to the containment of $Ag_2O$. Further, as the content of $Ag_2O$ was greater, the characteristic temperature tended to be lower. On the other hand, since the thermal expansion coefficient tended to be increased, the blending amount of the lead-free low-melting glass had to be decreased and the blending amount of the low thermal expansion filler particles had to be increased for the sealing material as shown in Table 5. Particularly, in the lead-free low-melting glass A-14 to 18, lowering of the characteristic temperature was further intended by changing the relation: $TeO_2 > Ag_2O$ for A-6 to 13 in view of mol % into the relation: $TeO_2 < Ag_2O$ in A-14 to 18 by increasing the $Ag_2O$ content. It is considered that the difference of the relation causes classification of the sealing materials AC-6 to 13 and AC-14 to 18 as shown in FIG. 21 although they are identical $V_2O_5$—$TeO_2$—$Ag_2O$ series lead-free low-melting glass.

In view of the above, in the vacuum heat insulating member of the comparative example, it was found that the surface temperature elevation of the substrate 1 was small and the heat insulating property was increased by using the lead-free low-melting glass of high characteristic temperature and applying atmospheric baking and vacuum sealing at high temperature to the sealing material. It is considered that the internal space of the vacuum heat insulating member tends to be degassed and increased further for evacuation by vacuum sealing at higher temperature.

Relative to the vacuum heat insulating member of the comparative example described above, in the vacuum heat insulating member of the example manufactured by using the sealing materials A-1 to 18 in Table 4, temperature elevation at the central portion on the surface of the substrate 1 was remarkably suppressed and the temperature change was scarcely observed for the lapsed time of 10 min or more, and the heat insulating property was improved considerably compared with the comparative example as shown in FIG. 21. The sealing part was in the state shown in FIG. 2 in a case of using any sealing material in Table 4. That is, the sealing part had a glass phase 7 including the lead-free low-melting glass in Table 1 contained in the sealing material 4, and metal phases 8, 8' including lead-free low-melting metal in Table 2. And the metal phase 8 was formed on the side of the internal space 5 of the glass phase 7. The metal phases 8 and 8' were formed by transfer of the melted lead-free low-melting metal melted on both ends of the sealing part in the lead-free low-melting glass due to pressurization by the clip 17 and loading from the substrate 2 when the lead-free low-melting metal was melted. Further, the glass phase 7 was formed also by transfer of the melted lead-free low-melting metal in the lead-free low-melting glass on both ends of the sealing part in the lead-free non-melting glass. Accordingly, a slight amount of the metal layer left in a layered form was often found in the glass phase 7. In this example, as shown in FIG. 19, sealing was applied by the sealing material 4 under evacuation to the inside of the heating furnace 19 to evacuate the internal space 5 of the vacuum heat insulating member. As explained with reference to FIGS. 12A to 15B, in the method of sealing under evacuation only the internal space 5 of the vacuum heat insulating member from an exhaust hole 20 and an exhaust pipe 21 disposed to the substrate 1 (exhaust pipe system), the metal phase 8 in the glass phase 7 on the side of the internal space 5 was increased and, on the other hand, the metal phase 8' on the outer side thereof was decreased or eliminated. This is because the lead-free low-melting metal melted during sealing is pulled to the internal space 5, and a vacuum heat insulating member of preferred heat insulating property could be obtained also by this sealing method.

In view of the above, it is considered that the heat insulating property of the vacuum heat insulating member could be improved considerably by remarkably decreasing the exposed area of the glass phase 7 to the internal space 5, which may possibly cause generation of gases such as $CO_2$ by the formation of the metal phase 8 as shown by the sealed state in FIGS. 2A, 2B.

Further, it was found that the sealing materials could be classified into three groups of AB-1 to 5, AB-6 to 13, and AB-14 to 18 depending on the types of the lead-free low-melting glass A-1 to 18 in Table 1 blended to the sealing materials AB-1 to 18 shown in Table 4. The vacuum heat insulating member causing the least surface temperature elevation of the substrate 1 is in the case of using the sealing materials AB-6 to 13, temperature elevation was somewhat greater in the case of using the sealing materials AB-14 to 18 and was further greater in the case of using the sealing materials AB-1 to 5. That is, for the lead-free low-melting glass contained in the sealing material, $V_2O_5$—$TeO_2$—$Ag_2O$ series of A-6 to 18 was more effective than $V_2O_5$—$TeO_2$ series of A-1 to 5 for the improvement of the heat insulating property of the vacuum insulating member. This is opposite to the result of evaluation for the heat insulating property of the vacuum heat insulating member of the comparative example. Further, any of the lead-free low-melting metals B-1 to 7 in Table 2 was blended in addition to the lead-free low-melting glass in Table 1 to the sealing materials AB-1 to 18 shown in Table 4, and incorporation of tin as a principal component in the lead-free low-melting metal was effective for the improvement of the heat insulating property of the vacuum heat insulating member. In the case of using the sealing materials AB-6 to 13 which was particularly effective, the lead-free low-melting metals B-2 to 4 were compounded to the sealing material and silver was contained further therein. It is considered that when tin and silver are contained in the lead-free low-melting metal, reaction with tin was suppressed in the $V_2O_5$—$TeO_2$—$Ag_2O$ series lead-free low-melting glass, and diffusion of silver ions in the glass into tin in the low-melting metal is less caused. If a great amount of silver ions are out of the $V_2O_5$—$TeO_2$—$Ag_2O$ series lead-free low-melting glass, the characteristic temperature elevates sometimes making it difficult for airtight sealing in vacuum. Accordingly, it was found that containment of both of tin and silver as the lead-free low-melting metal is effective for vacuum airtight sealing in a case of using the $V_2O$—$TeO_2$—$Ag_2O$ series lead-free low-melting glass for the sealing material.

In view of the above, in the result of evaluation for the heat insulating property of the vacuum heat insulating member manufactured in this example, it was found that the heat insulating property was improved remarkably when the sealing part contained the glass phase and the metal phase disposed on the side of the internal space of the glass phase. The glass phase in the sealing part is a lead-free low-melting glass containing vanadium oxide ($V_2O_5$) and tellurium oxide ($TeO_2$) and, in addition, the metal phase was a lead-free low-melting metal containing tin (Sn). It was found particularly preferred that the glass phase in the sealing part includes lead-free low-melting glass further containing silver oxide ($Ag_2O$) and the metal phase is lead-free low-melting metal further containing silver (Ag).

Example 2

In Example 2, the vacuum heat insulating member shown in FIGS. 2A, 2B was manufactured in the same manner as in Example 1 by a sealing material using the lead-free low-melting glass A-1, 7, and 11 shown in Table 1, the lead-free low-melting metals B-1 to 3 shown in Table 2 and low thermal expansion filler particles C-1 to 3 shown in Table 3 and the heat insulating property thereof was evaluated. Further, also the sealing material 4 was used in the form of the paste as in Example 1.

Table 6 shows the type and the blending composition of the sealing material used in this example, that is, the type and the blending ratio of the lead-free low-melting glass A-1, 7 and 11 in Table 1, lead-free low-melting metals B-1 to 3 in Table 2, and low thermal expansion filler particles C-1 to 3 in Table 4, as well as the atmospheric baking temperature and the vacuum sealing temperature thereof. A vacuum heat insulating member was manufactured in the same manner as in Example 1 by using the paste of the sealing materials ABC-1 to 11 shown in Table 6.

A soda-lime glass substrate of the size identical with that of Example 1 (250 mm×200 mm×3 mm) was used for the first substrate 1 and the second substrate 2, and a heat reflecting film 6 was formed over the entire surface on one side of the second substrate 2. Further, the height of the spacer 3 was set to 0.15 mm and the internal space 5 in the vacuum state was formed.

The heat insulating property of the manufactured vacuum heat insulating member was evaluated in the same manner as in Example 1.

Figure 22A:
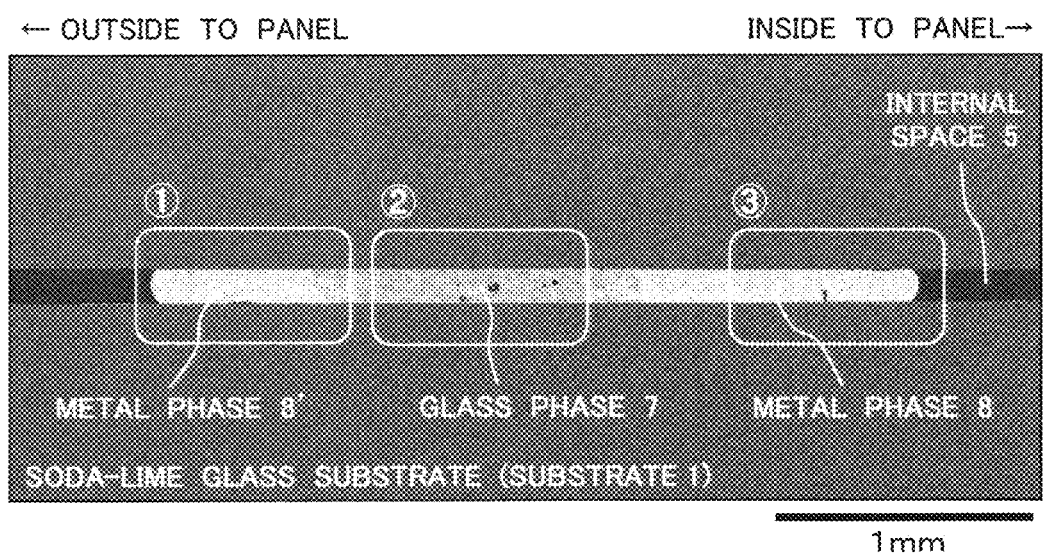
FIG. 22A is a photograph by a scanning electron microscope (SEM) for a cross section of a sealing part of a vacuum heat insulating member produced in Example 2.
Figure 22B:
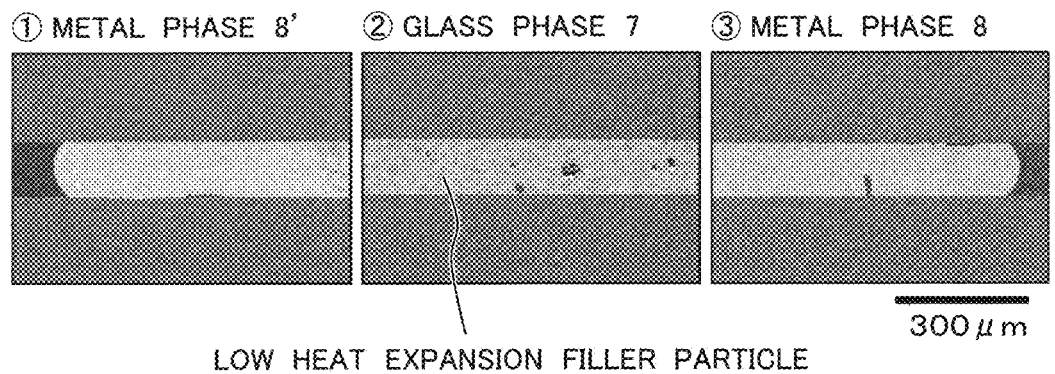
FIG. 22B is a partially enlarged photograph of FIG. 22A.

FIG. 22A and FIG. 22B show scanning electron microscopic (SEM) photographs for the cross section of the sealing part of the vacuum heat insulating member manufactured by using the sealing material ABC-4. FIG. 22B is a partially enlarged cross sectional photograph of FIG. 22A.

surface of the substrate 1 was remarkably suppressed and, in addition, change of temperature was scarcely observed after lapse of time of 10 min or more and the heat insulating property was improved considerably in the same manner as in Example 1. The trend of the temperature elevation was somewhat different depending on the type and the blending ratio of the lead-free low-melting glass, the lead-free low-melting metal, and the low thermal expansion filler particles contained in the sealing material 4. While identical temperature change was observed for the vacuum heat insulating members manufactured by using the sealing materials ABC-1 to 3 containing the $V_2O_5$—$TeO_2$ series lead-free low-melting glass A-1, the temperature elevation was slightly greater when compared with the vacuum heat insulating members manufactured by using the sealing materials ABC-4 to 11 containing $V_2O_5$—$TeO_2$—$Ag_2O$ series lead-free low-melting glass A-7 or A-11 having characteristic temperature considerably lower than that of $V_2O_5$—$TeO_2$ series. Among the sealing materials ABC-4 to 11, a slight difference was recognized for the heat insulating property between ABC-4, 5, 8 and 9 and ABC-6, 7, 10 and 11. The temperature elevation trend was smaller as the blending amount of the lead-free low-melting glass was smaller and the blending amount of the lead-free low-melting metal was greater, and a vacuum heat insulating member having heat insulating property improved even slightly was obtained. The sealing part of the vacuum heat insulating member manufactured by using the sealing materials ABC-1 to 11 were formed of the glass phase 7 and the metal phase 8 as shown in FIGS. 2A, 2B or FIGS. 22A, 22B in which the metal phase 8 was formed on the side of the internal space 5 of the glass phase 7 in the case of using any sealing material. When the metal phase 8 was formed on the side of the internal space 5 of the glass phase 7, the exposed area of the glass phase 7 to the side of the internal space 5 was decreased. It is considered that the amount of the gases released from the glass phase 7 to the internal space 5 was decreased by the metal phase 8 to obtain a vacuum heat insulating member of preferred heat insulating property. Further, as explained with reference to FIGS. 12A to 15B, the vacuum heat insulating member of this example was attempted to be manufactured also by the method of sealing

TABLE 6

| Example No. | Lead-Free Low-Melting Glass | | Lead-Free Low-Melting Metal | | Low Thermal Expansion Filler Particle | | Atmospheric Baking Temperature (° C.) | Vacuum Sealing Temperature (° C.) |
|---|---|---|---|---|---|---|---|---|
| | Type | Content [volume %] | Type | Content [volume %] | Type | Content [volume %] | | |
| ABC-1 | A-1 | 30 | B-1 | 50 | C-3 | 20 | 400 | 390 |
| ABC-2 | A-1 | 40 | B-1 | 45 | C-2 | 15 | 400 | 390 |
| ABC-3 | A-1 | 50 | B-1 | 40 | C-1 | 10 | 400 | 390 |
| ABC-4 | A-7 | 30 | B-4 | 50 | C-2 | 20 | 275 | 290 |
| ABC-5 | A-7 | 35 | B-4 | 45 | C-2 | 20 | 275 | 290 |
| ABC-6 | A-7 | 40 | B-2 | 35 | C-1 | 25 | 275 | 290 |
| ABC-7 | A-7 | 45 | B-3 | 30 | C-1 | 25 | 275 | 290 |
| ABC-8 | A-11 | 30 | B-2 | 50 | C-1 | 20 | 265 | 280 |
| ABC-9 | A-11 | 35 | B-3 | 45 | C-1 | 20 | 265 | 280 |
| ABC-10 | A-11 | 40 | B-4 | 35 | C-2 | 25 | 265 | 280 |
| ABC-11 | A-11 | 45 | B-2 | 30 | C-2 | 25 | 265 | 280 |

Figure 23:
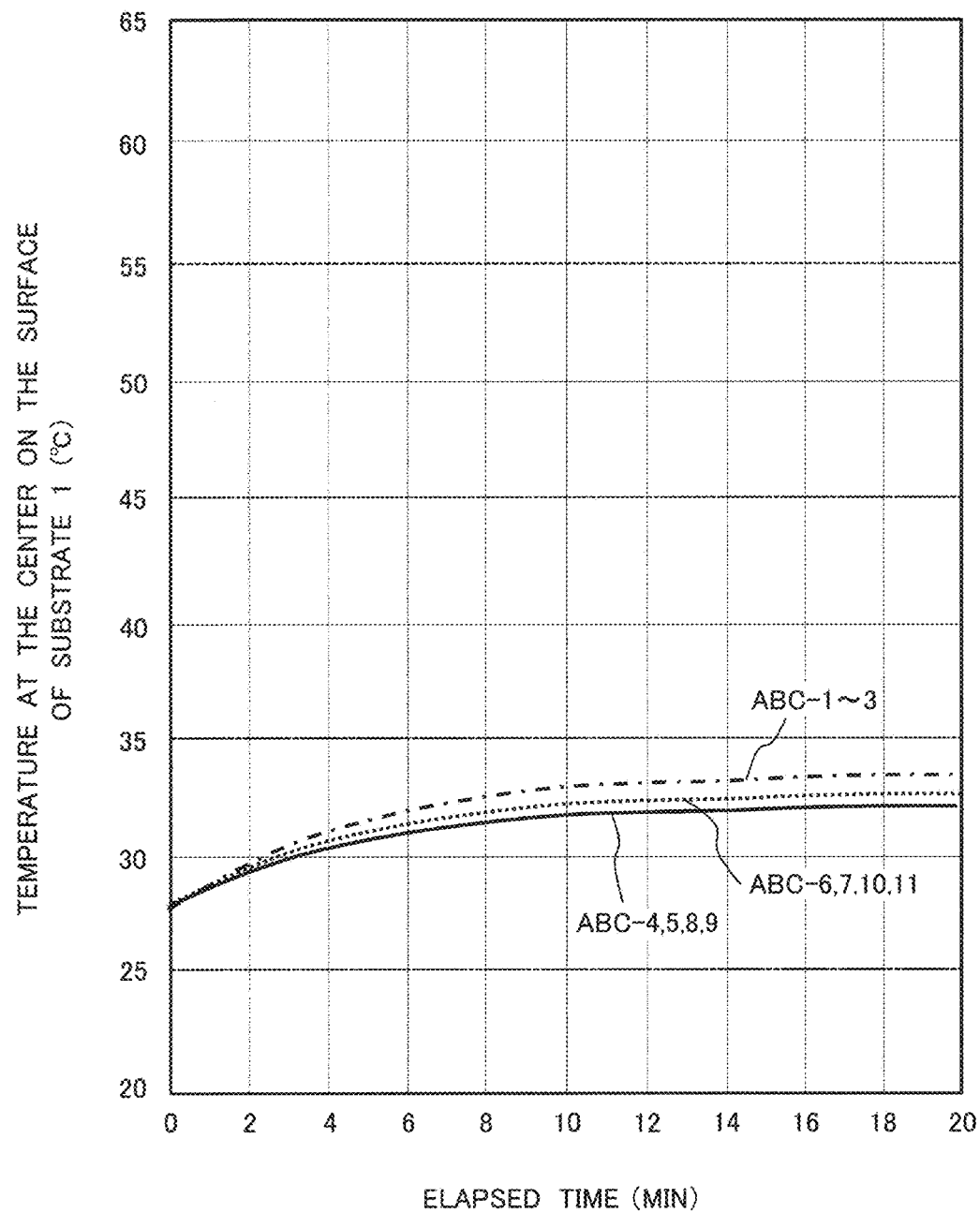
FIG. 23 is a graph showing a change of temperature with time at a central portion on one side of a vacuum heat insulating member of Example 2 when a central portion on the other side thereof is heated to 60° C.

FIG. 23 shows the result of the evaluation for the heat insulating property of the vacuum heat insulating member of Example 2, that is, change of temperature with time at the central portion on the surface of a substrate 1 when the central portion on the surface of a substrate 2 was heated to 60° C. In the vacuum heat insulating member manufactured by using the sealing materials ABC-1 to 11 shown in Table 6, the temperature elevation at the central portion on the while evacuating only the internal space 5 of the vacuum heat insulating member from the exhaust hole 20 and the exhaust pipe 21 disposed in the substrate 1 (exhaust pipe system). In the state of the sealing part, the metal phase 8 on the side of the internal space 5 of the glass phase 7 was increased and, on the other hand, the metal phase 8' on the outside thereof was decreased or eliminated. This is because the lead-free low-melting metal melted during sealing was attracted to the internal space 5, and a vacuum heat insulating member of preferred heat insulating property was obtained also by this sealing method.

As illustrated in FIG. 23, it is considered that the slight difference of the heat insulating property in the vacuum heat insulating members manufactured by using the sealing materials ABC-4 to 11 is due to the difference of the exposed area of the glass phase 7 to the internal space 5. That is, it is considered for the sealing materials ABC-4, 5, 8 and 9 that a sealing part having less area exposed on the glass phase 7 to the internal space 5 than the sealing materials ABC-6, 7, 10 and 11 with a larger blending amount of the lead-free low-melting glass and a smaller blending amount of the lead-free low-melting metal was obtained, and the heat insulating property of the vacuum heat insulating member could be improved even slightly. Most of the low thermal expansion filler particles C-1 to 3 in Table 3 contained in the sealing material 4 mostly dispersed and present in the glass phase 7 as shown in FIGS. 22A, 22B. The glass phase 7 in which the low thermal expansion filler particles were dispersed and present has an effect of lowering the thermal expansion coefficient of the glass phase 7 and can decrease the thermal expansion difference with the soda-lime glass substrate used for the substrate 1 or the substrate 2 and is effective for moderating the thermal residual stress. This is effective for improving the joining strength of the sealing part and blending of the low thermal expansion filler to the sealing material 4 can naturally contribute to the improvement of the reliability of the vacuum heat insulating member. Particularly, as the low thermal expansion filler, zirconium tungstate phosphate: $Zr_2(WO_4)(PO_4)_2$ showing preferred wettability with the $V_2O_5$—$TeO_2$ series lead-free low-melting glass or the $V_2O_5$—$TeO_1$—$Ag_2O$ series lead-free low-melting glass and having a negative thermal expansion coefficient or a material based thereon was effective.

In view of the above, the vacuum heat insulating member manufactured in this example can be developed effectively to vacuum heat insulating multilayer glass panels, etc. applied to window glass for building materials.

Example 3

In Example 3, applicability of a tempered glass as a substrate of a vacuum heat insulating member was confirmed. As described above, when a tempered glass is used as a substrate of the vacuum heat insulating member, it is necessary to apply sealing at a low temperature not lowering the mechanical strength thereof as much as possible, particularly, at 320° C. or lower.

A thermally tempered soda-lime glass substrate was used for the first substrate 1 and the second substrate 2 in this example, a heat reflecting film 6 was formed on the second substrate 2. The substrate 1 and the substrate 2 were sized 600 mm×500 mm×5 mm. For sealing materials 4, ABC-4, 6, 8 and 10 in Table 6 were used as the example and AC-7 and AC-11 in Table 5 were used as the comparative example, and they were used in the form of a paste in the same manner as in Example 1 and Example 2. Since the atmospheric baking temperature and the vacuum sealing temperature are 320° C. or lower as shown in Table 6 or Table 5, it is considered that the mechanical strength of the thermally tempered soda-lime glass substrate used as the substrate is not deteriorated. Further, the height of the spacer 3 for forming the internal space 5 in the vacuum state was 0.25 mm. The vacuum heat insulating member was prepared in the same manner as in Example 1 and the heat insulating property was evaluated in comparison by the method identical with that of Example 1.

The thermally tempered soda-lime glass substrate used for the first substrate 1 or the second substrate 2 had larger undulation or warp at the surface compared with the soda-lime glass substrate not subjected to thermal tempering but the vacuum heat insulating member could be manufactured both in the example and the comparative example. Further, the sealing part disposed to the peripheral part was not easily peeled or the like to cause leakage from the internal space 5 in a vacuum state irrespective of increase in the size and the weight of the substrate. Thus, the heat insulating property of the vacuum heat insulating member manufactured in the example and the comparative example could be evaluated properly.

Figure 24:
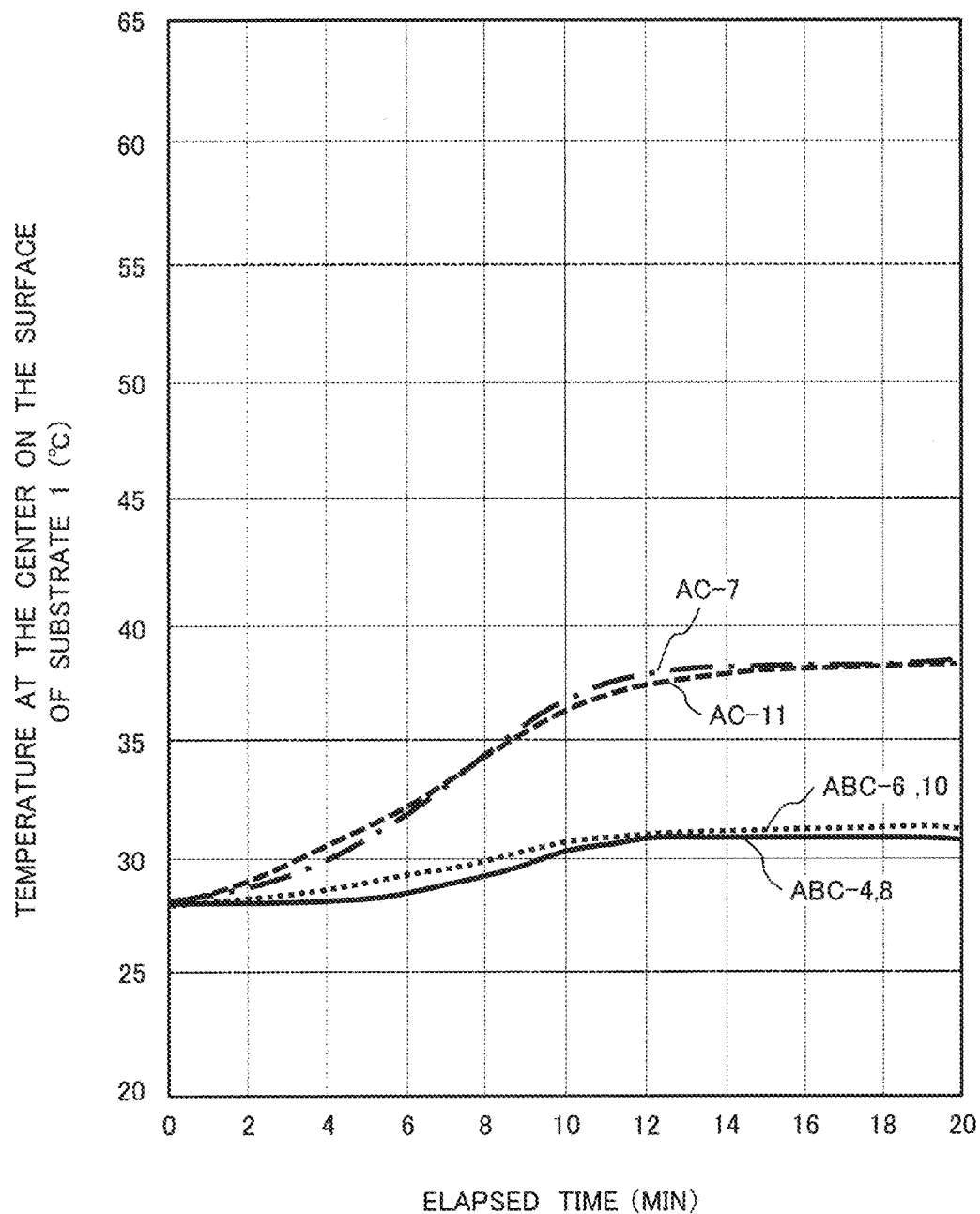
FIG. 24 is a graph showing a change of temperature with time at a central portion on one side of a vacuum heat insulating member of Example 3 when a central portion on the other side thereof is heated to 60° C.

FIG. 24 shows the result of evaluation for the heat insulating property of the vacuum heat insulating member manufactured in Example 3, that is, the change of temperature with time at the central portion on the surface of the substrate 1 when the central portion on the surface of the substrate 2 was heated to 60° C. The heat insulating property of the vacuum heat insulating members of the comparative example prepared by using the sealing members AC-7 and 11 in Table 5 respectively shows a result where the temperature elevation at the central portion on the surface of the substrate 1 was smaller than that in FIG. 21 of Example 1. The heat insulating property was improved because the volume of the internal space 5 was increased by increasing the size of the substrate and the height of the spacer 3. Further, in a case of using the sealing materials AC-7 and AC-11 in the same manner as in Example 1, no substantial difference was recognized in the heat insulating property of the vacuum heat insulating members but they were substantially identical. On the contrary, in the vacuum heat insulating members of the example manufactured respectively by using ABC-4, 6, 8 and 10 in Table 6, temperature elevation at the central portion on the surface of the substrate 1 was suppressed remarkably and the heat insulating property was improved considerably. Further, in a case of using the sealing materials ABC-4, 6, 8 and 10 in the same manner as in Example 2, the heat insulating property was improved slightly in the case of using ABC-4 and 8 than in the case of using ABC-8 and 10. This has a concern with the blending amount of the lead-free low-melting glass and the lead-free low-melting metal contained in the sealing material 4. It is considered that as the blending amount of the lead-free low-melting glass was smaller and the blending amount of the lead-free low-melting metal is larger, the temperature elevation trend was smaller and the heat insulating property was improved although slightly.

In view of the above, it was found that the tempered glass could be applied effectively to the substrate. Application of the tempered glass to the substrate can contribute to the prevention of breakage caused by high evacuation of the internal space 5 and for security, crime prevention, etc. compared with usual glass basic material.

Further, the vacuum heat insulating member according to Example 3 can be developed effectively to the vacuum heat insulating multilayer glass panels, etc. applied to window glass for building materials, etc.

Example 4

In Example 4, the vacuum heat insulating members shown in FIGS. 3A, 3B was manufactured by using the sealing members shown in FIGS. 6A, 6B and the heat insulating property was evaluated. The type of the ribbon-shaped metal foil 9 used for the sealing material 4 is shown in Table 7. Metal foils D-5 and 6 shown in Table 7 were clad materials shown in FIGS. 4A, 4B and were made of metal materials of D-1 to 4. Further, the metal foils D-1 to 6 were sized to 5 mm width and 0.16 mm thickness.

TABLE 7

| No. | Metal Foil (mass %) | Width (mm) | Thickness (mm) | Thermal Expansion Coefficient ($\times 10^{-7}/°$ C.) | Attraction to Magnet |
|---|---|---|---|---|---|
| D-1 | 52Fe—48Ni | 5 | 0.16 | 88 | Attracted |
| D-2 | 52Fe—42Ni—6Cr | 5 | 0.16 | 81 | Attracted |
| D-3 | 100Al | 5 | 0.16 | 238 | Not Attracted |
| D-4 | 95Al—5Si | 5 | 0.16 | 196 | Not Attracted |
| D-5 | 95Al—5Si/52Fe—48Ni/95Al—5Si | 5 | 0.16 (0.02/0.12/0.02) | 95 | Attracted |
| D-6 | 100Al/52Fe—42Ni—6Cr/100Al | 5 | 0.16 (0.01/0.14/0.01) | 85 | Attracted |

(Preparation of Sealing Material)

Sealing materials were prepared by the manufacturing method of the sealing material explained with reference to FIG. 7 by using the sealing material AB-8 shown in Table 4, a paste of the sealing material ABC-7 shown in Table 6 and metal foils D-1 to 6 shown in Table 7. In the manufacturing method in FIG. 7, the tensile speed of the metal foil was about 50 to 60 cm/min, the drying temperature was at 150 to 170° C., and the baking temperature was at a temperature higher by about 30 to 50° C. than the softening point of the lead-free low-melting glass used. Further, the thickness of the coatings 13, 13' baked and formed on both surfaces of the metal foil 9 was about 30 to 40 μm, respectively.

Further, as a comparative example, coatings were formed on both surfaces of the ribbon-shaped metal foil by using the paste of the sealing material AC-8 shown in Table 5 to prepare a sealing material. For the sealing materials 4 of the example prepared by using the pastes of AB-8 in Table 4 and ABC-7 in Table 6 (FIG. 6A, FIG. 6B) and the sealing materials of the comparative example prepared by using the paste of AC-8 in Table 5, coatings 13, 13' were formed with good bondability in a case where the metal foil 9 in Table 7 was D-3 to 6. This is because the $V_2O_5$—$TeO_2$—$Ag_2O$ series lead-free low-melting glass 11, 11' contained in the coatings 13, 13' has excellent wettability and bondability with the aluminum metal or the alloy thereof. However, in a case where the metal foil 9 was D-1 and 2, it cannot be said that the bondability of the coatings 13, 13' was preferred and it was necessary to take a sufficient care in the handling so that the coatings 13, 13' were not peeled for the sealing material 4 using the metal foil 9 of D-1 and 2. This is because the wettability and the bondability of the $V_2O_5$—$TeO_2$—$Ag_2O$ series lead-free low-melting glass 11, 11', contained in the coatings 13, 13' with iron-nickel series alloy or iron-nickel-chromium series alloy cannot be said satisfactory.

(Manufacture of Vacuum Heat Insulating Member)

The vacuum heat insulating member shown in FIGS. 3A, 3B was manufactured by using the prepared sealing materials. A soda-lime glass substrate was used for the first substrate 1 and the second substrate 2, and a heat reflecting film 6 was formed to the second substrate 2. The first substrate 1 and the second substrate 2 were sized 600 mm×500 mm×3 mm and the height of the spacer 3 was 0.2 mm for forming the internal space 5 in the evacuation state.

Since the sealing material 4 using D-1, 2, 5 and 6 using the iron-nickel series alloy or iron-nickel-chromium series alloy as the metal foil tends to be attracted to a magnet, the vacuum heat insulating member was manufactured by the production method of the vacuum heat insulating member explained with reference to FIGS. 9A to 11B.

Since the sealing material 4 using D-3 (aluminum metal) and D-4 (aluminum series alloy) as the metal foil is not attracted to the magnet and the sealing material 4 tends to be moved upon disposition of the sealing material 4 to the substrate 1, disposition of the substrate 2 and fixing by the clip 17, the vacuum heat insulating member was manufactured with an utmost care so that no large gap is formed to the edge portion 15.

Figures 25A, 25B:
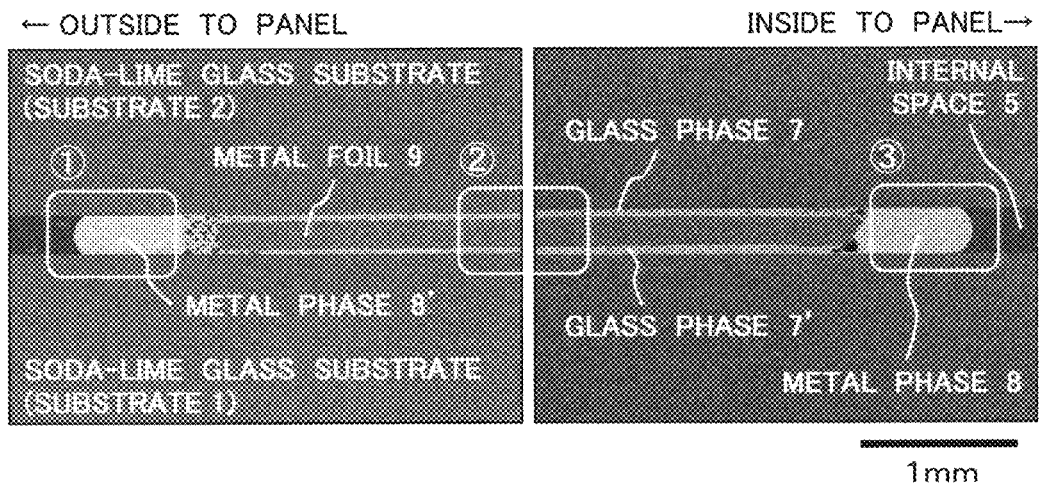
FIG. 25A is a photograph by a scanning electron microscope (SEM) for a cross section of a sealing part of a vacuum heat insulating member produced in Example 4.
FIG. 25B is a partially enlarged photograph of FIG. 25A.

The vacuum sealing temperature was higher by 10 to 20° C. than that in Example 1 or Example 2 for securely crashing the coatings 13 and 13' on both surfaces of the metal foil 9 and for airtight sealing. FIGS. 25A and 25B show scanning electron microscopic (SEM) photographs for the cross section of the sealing part in the vacuum heat insulating member manufactured by using the sealing materials including ABC-7 in Table 6 and D-2 in Table 7. FIG. 25B is a partially enlarged cross sectional photograph of FIG. 25A.

(Evaluation for Heat Insulating Property of Vacuum Heat Insulating Member)

Figure 26:
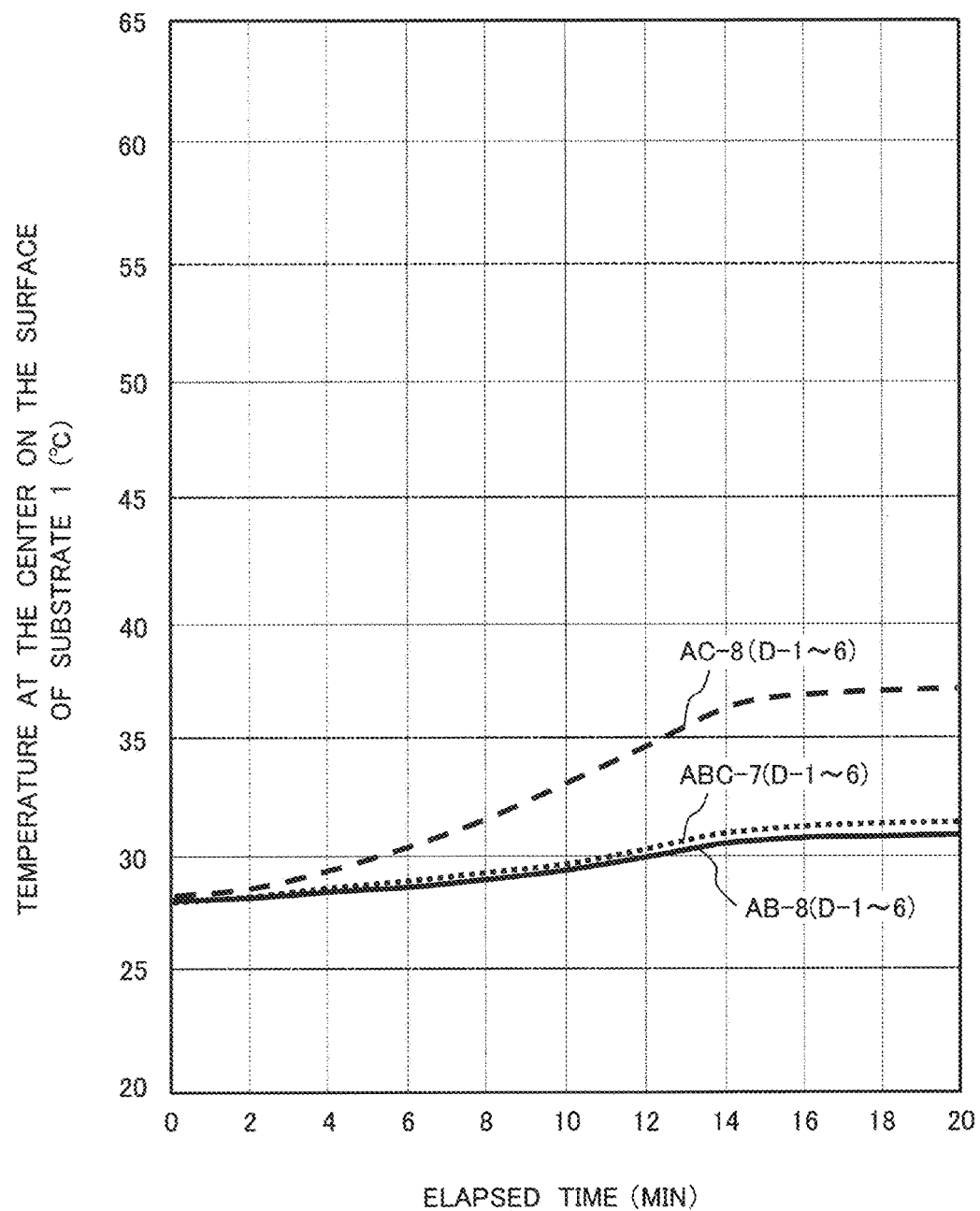
FIG. 26 is a graph showing a change of temperature with time at a central portion on one side of a vacuum heat insulating member of Example 4 when a central portion on the other side thereof is heated to 60° C.

The heat insulating property of the vacuum heat insulating member that could be sealed airtightly was evaluated in the same manner as in Example 1. FIG. 26 shows the result of evaluation for the heat insulating property, that is, the temperature change with time at the central portion on the surface of the substrate 1 when the central portion on the surface of the substrate 2 was heated to 60° C. The vacuum heat insulating member of the example showed remarkably small temperature elevation and had preferred heat insulating property when compared with the vacuum heat insulating member of the comparative example. Further, the difference of the heat insulating property depending on the material of the metal foil 9 was scarcely observed in the vacuum heat insulating members both for the example and the comparative example. The sealing part of the vacuum heat insulating member in the example was in the state and the configuration shown in FIGS. 3A and 3B, FIGS. 11A, 11B and FIGS. 25A, 25B. That is, metal phases 8, 8' were formed on both ends of the glass phases 7, 7' on the surface and the rear surface of the metal foil 9. It is considered that the exposed area of the glass phases 7, 7' to the side of the internal space 5 caused by gas generation was decreased by the metal phase 8 formed on the side of the internal space 5, thereby improving the vacuum degree and increasing the heat insulation. It is considered that the slight difference of the heat insulating property between AB-8 and ABC-7 is caused by that the blending amount of the lead-free low-melting glass 11, 11' was smaller and the blending amount of the lead-free low-melting metal 12, 12' was larger in AB-8 than in ABC-7 due to the difference of the exposed area of the glass phases 7, 7. Further, a trace where low-melting metal 12, 12' transferred to both ends, that is, streak-like metal phase was sometimes observed in the glass phase 7, 7'.

As has been described above, in the vacuum heat insulating member of the example, preferred heat insulating property was obtained when airtight sealing could be attained. However, if the difference of the thermal expansion coefficient was large between the soda-lime glass substrate used for the substrate 1 and the substrate 2 and the metal foil 9, airtight sealing could not sometimes be attained and the internal space 5 could not be sealed in an evacuated state. In this example, the difference of the thermal expansion coefficient was extremely large between the soda-lime glass substrate used for the substrate 1 and the substrate 2 and D-3 of aluminum metal and D-4 of aluminum alloy used for the metal foil 9, and the sealing part was sometimes peeled partially failing to obtain airtight sealing. On the other hand, in a case of using D-1, 2, 5 and 6 of the metal foil 9, their thermal expansion coefficient was close to that of the soda-lime-glass substrate used for the substrate 1 and the substrate 2 and airtight sealing scarcely failed.

In view of the above, the amount of using expensive $V_2O_5$—$TeO_2$—$Ag_2O$ series lead-free low-melting glass 11, 11' which causes gas release can be decreased remarkably by using any of iron-nickel series alloy, the iron-nickel-chromium series alloy, the aluminum metal, the aluminum series alloy, and the clad material thereof. Further, the number of steps of manufacturing vacuum heat insulating member can be decreased. As a result, high heat insulation and cost reduction can be made compatible for the vacuum heat insulating member.

Further, as the metal foil 9 of the sealing material 4, a clad material in which layers of aluminum metal or aluminum series alloy are formed on both surfaces of a ribbon foil including iron-nickel series alloy or iron-nickel-chromium series alloy as the metal foil 9 of the sealing material 4 is particularly preferred. This is because coatings 13, 13' containing lead-free low-melting glass 11, 11' and metal particles 12, 12' can be formed with good bondability and the sealing material can be transported or disposed simply by using a magnet. Further, since the thermal expansion coefficients are matched favorably, a sealing part of high reliability could be obtained.

Example 5

An inexpensive soda-lime glass substrate and a reinforced glass substrate prepared therefrom are often used for the substrate in the vacuum heat insulating member, particularly, a vacuum heat insulating multilayer glass panel. However, undulation or warp is present in the substrate. If the undulation or warp is large, this sometimes hinders the airtight sealing. For countermeasure, in Example 5, a vacuum heat insulating multilayer glass panel using a sealing material 4 by using a metal foil 9 having a plurality of through holes 10 was manufactured and the heat insulating property was evaluated.

(Preparation of Sealing Material)

A sealing material was prepared in the same manner as in Example 4 except for using the clad member D-6 in Table 7 (FIGS. 4A, 4B) for the ribbon-shaped metal foil 9, forming through holes 10 each of about 0.3 to 0.5 mm diameter at about 5 mm pitch and forming coatings on both surfaces of the metal foil by using the sealing material AB-11 shown in Table 4 and the sealing material ABC-9 shown in Table 6.

The coatings 13, 13' of the prepared sealing material 4 were firmly bonded to the metal aluminum foil. This is because the clad material was applied with an aluminum metal layer of good wettability and bondability with the $V_2O_5$—$TeO_2$—$Ag_2O$ series lead-free low-melting glass on both surfaces of the metal foil 9 of D-6. Further, the coatings 13, 13' were filled also in the through holes 10 of the metal foil 9 of D-6.

(Manufacture of Vacuum Heat Insulating Member)

A vacuum heat insulating member was manufactured in the same manner as in Example 4 except for using a thermally tempered soda-lime glass substrate for the first substrate 1 and the second substrate 2, preparing each of them to a size of 1,000 mm×900 mm×5 mm having undulation of about 0.1 mm, and using the sealing material described above.

It was found that airtight sealing could be attained by a plurality of through holes 10 formed in the metal foil 9 even in a case of using a substrate of large undulation. Further, since the thermal expansion coefficient of the metal foil 9 of D-6 shown in Table 7 is close to the thermal expansion coefficient of the thermally tempered soda-lime glass substrate used for the substrate 1 and the substrate 2, a sealing part with less thermal residual stress and of high mechanical reliability could be obtained.

(Evaluation for Heat Insulating Property of Vacuum Heat Insulating Member)

Figure 27:
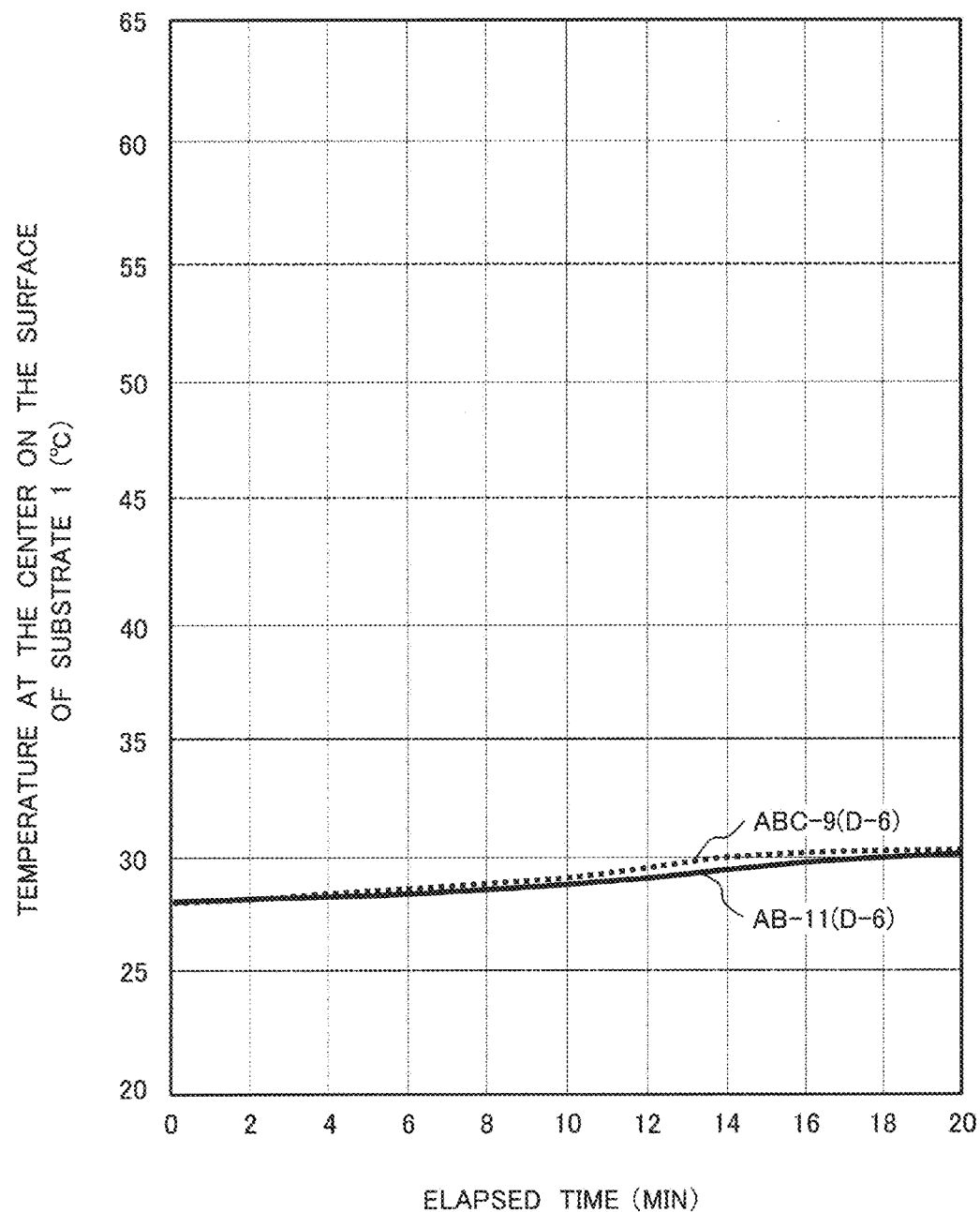
FIG. 27 is a graph showing a change of temperature with time at a central portion on one side of a vacuum heat insulating member of Example 5 when a central portion on the other side thereof is heated to 60° C.

The heat insulating property of the manufactured vacuum heat insulating member was evaluated in the same manner as in Example 1. FIG. 27 shows the result of evaluation for the heat insulating property of the vacuum heat insulating member, that is, the change of temperature with time at the central portion on the surface of the substrate 1 when the central portion on the surface of the substrate 2 was heated to 60° C. The manufactured vacuum heat insulating member of the example showed remarkably small temperature elevation and had excellent heat insulating property. The sealing part of the vacuum heat insulating member of the example was in the state and configuration shown in FIGS. 5A, 5B. That is, metal phases 8, 8 were formed on both ends of the glass phases 7, 7' on the surface and the rear surface of the metal foil 9. Further, the glass phase and the metal phase were formed also in the through holes 10. It is considered that the exposed area of the glass phases 7, 7' to the side of the internal space 5 causing gas generation was decreased due to the metal phase 8 formed on the side of the internal space 5, which improved the vacuum degree and remarkably improved the heat insulating property. The slight difference of the heat insulating property between AB-11 and ABC-9 is the difference of the exposed area of the glass phases 7, 7'. It is considered that this is due to that the blending amount of the lead-free low-melting glass 11, 11' was smaller and the blending amount of the lead-free low-melting metals 12, 12' was larger in AB-11 than in ABC-9. Further, traces where the low melting metals 12, 12' were transferred to both ends, that is, the streak-like metal phase was sometimes observed in the glass phases 7, 7'. Further, it was observed that the glass phase and the metal phase flow back and forth between the surface and the rear surface by way of the through holes 10 in the metal foil 9 to absorb the undulation of the substrate.

Example 6

In Example 6, a vacuum heat insulating member was manufactured by the production method of the vacuum heat insulating member explained with reference to FIGS. 12A to 15B and the heat insulating property thereof was evaluated.

(Preparation of Sealing Material)

A sealing material with no through holes in the metal foil was prepared in the same manner as in Example 4 except for using D-5 shown in Table 7 as the metal foil and forming coatings on both surfaces of the metal foil by using the paste of ABC-5 shown in Table 6.

Further, a sealing material with through holes in the metal foil was prepared in the same manner as in Example 5 except for using D-5 shown in Table 7 as the metal foil and forming the coatings on both surfaces of the metal foil by using the paste of ABC-5 shown in Table 6.

In the two types of the prepared sealing materials, since the metal foil was a clad material applied with an aluminum alloy layer of good wettability and bondability to the $V_2O_5$—$TeO_2$—$Ag_2O$ series lead-free low-melting glass, the coatings and the metal foil were firmly bonded. Further, in the metal foil of D-5 formed with the through holes, also the through holes 10 were filled with the coating.

(Production Method of Vacuum Heat Insulating Member)

Vacuum heat insulating members shown in FIGS. 3A, 3B and FIGS. 5A, 5B were manufactured by the production method for the vacuum heat insulating member explained with reference to FIGS. 12A to 15B by using the sealing materials prepared as described above. A soda-lime glass substrate was used for the first substrate 1 and the second substrate 2, and a heat reflecting film was formed on the second substrate 2. Further, an exhaust hole 20 and an exhaust pipe 21 were previously attached to the first substrate 1. The first substrate 1 and the second substrate 2 were each sized 1000 mm×900 mm×3 mm and the height of the spacer 3 for forming the internal space 5 in the vacuum state was 0.2 mm.

First, the sealing material 4 prepared as described above was disposed by the attraction force of the magnet 14 to the peripheral part of the substrate 1 to which the exhaust hole 20, the exhaust pipe 21, and a plurality of spacers 3 were disposed as shown in FIGS. 12A, 12B. Then, as shown in FIGS. 13A, 13B, the substrate 2 having a heat reflecting film 6 formed thereon was disposed so as to face the substrate 1 having the sealing material 4 disposed by the magnet 14 by way of a space 16, and fixed by a heat resistant clip 17. The magnet 14 was detached after fixing by the heat resistant clip 17. They were disposed inside a vacuum heating furnace 19 as shown in FIGS. 14A, 14B, an electric heater 22 was attached to the exhaust pipe 21, and a vacuum pump 18 was connected to the exhaust pipe 21. The space 16 between the substrate 1 and the substrate 2 was heated under evacuation from the exhaust hole 20 and the exhaust pipe 21 and the peripheral part was airtightly sealed by the sealing material 4 to evacuate the internal space 5. Upon sealing, since a large load was applied to the sealing part due to the vacuum state of the internal space 5, sealing can be attained at a temperature lower than that of the production method explained with reference to FIGS. 9A to 11B. In this example, sealing was applied at 265 to 270° C. which was somewhat higher than the softening point of the lead-free low-melting glass A-7 in Table 1 blended to the sealing material 4. Then, as shown in FIGS. 15A, 15B, the exhaust pipe 21 was burnt-off by an electric heater during or after cooling so that the vacuum state in the internal space 5 could be maintained.

Figure 28:
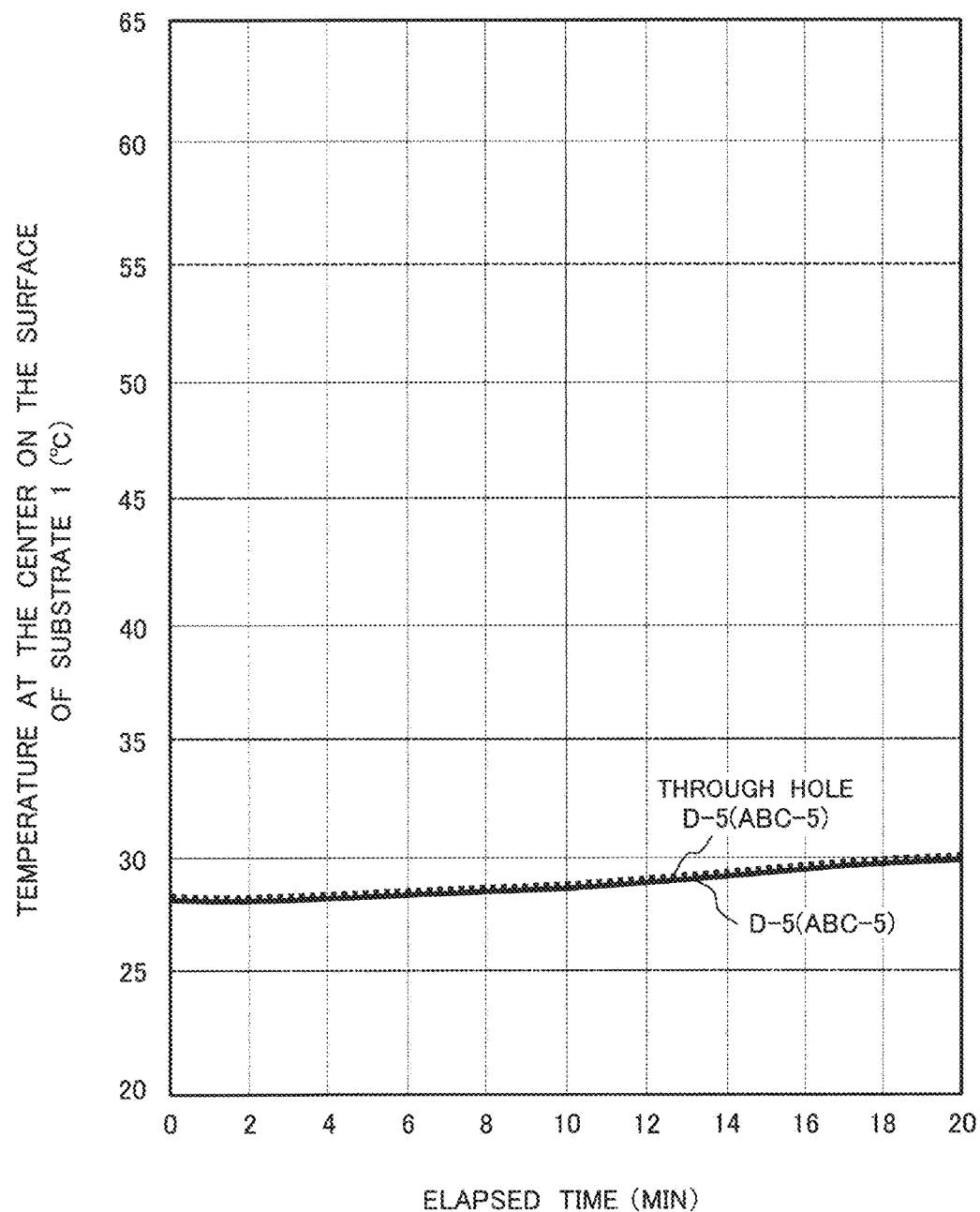
FIG. 28 is a graph showing a change of temperature with time at a central portion on one side of a vacuum heat insulating member of Example 6 when a central portion on the other side thereof is heated to 60° C.

The insulation property of the manufactured vacuum heat insulating member was evaluated by the method identical with that of Example 1. FIG. 28 shows the result of evaluation for the heat insulating property of the vacuum heat insulating member of Example 6. Both of two types of the vacuum heat insulating members manufactured in this example showed remarkably small temperature elevation in the same manner as in Example 5 and had excellent heat insulating property. Further, difference of the heat insulating property depending on the absence or presence of the through holes 10 in the metal foil 9 was scarcely observed. The sealing part of the two types of the vacuum heat insulating members was basically in the state and configuration shown in FIGS. 3A, 3B and FIGS. 5A, 5B. Referring to the metal phases 8, 8' formed on both ends of the glass phases 7, 7' on the surface and the rear surface of the metal foil 9, the metal phase 8 was formed more than the metal phase 8'. Depending on the sealed portions, there was a portion where only the metal phase 8 was present but the metal phase 8' was not observed. Further, in a case of using the metal foil 9 in which through holes 10 were formed, the glass phase and the metal phase were formed also in the through holes 10. The trace in which the low-melting metals 12, 12' transferred to both ends, that is, streak-like metal phase was sometimes observed in the glass phases 7, 7'. It is considered that the exposed area of the glass phases 7, 7' on the side of the internal space 5 causing gas generation was decreased by the metal phase 8 formed on the side of the internal space 5, which increased the vacuum degree and remarkably improved the heat insulating property.

In view of the above, it was found that the sealing material according to Example 6 could be adoptable also to the manufacturing method of evacuating the internal space 5 from the exhaust hole 20 and the exhaust pipe 21 upon sealing the vacuum heat insulating member.

According to the Example 1 to Example 6 described above, the present invention can provide a vacuum heat insulating member capable of attaining high heat insulation due to the improvement of the vacuum degree and capable of airtight sealing at a lower temperature, specifically, a vacuum heat insulating multilayer glass panel that can be, effectively, developed, particularly to window glass for building materials. The vacuum heat insulating member or the vacuum heat insulating multilayer glass panel can be developed also to portions or products requiring a heat insulating property such as window glass for vehicles, doors for commercial refrigerators or freezers, etc. Further, the present invention can provide a sealing material applicable effectively to the vacuum heat insulating members and a production method of the vacuum heat insulating member by the application of the sealing material.

DESCRIPTION OF REFERENCE NUMERALS

1: First substrate, 2: Second substrate, 3: Spacer, 4: Sealing material, 4': Sealing part, 5: Internal space, 6: Heat reflecting film, 7, 7': Glass phase, 8, 8': Metal phase, 9: Metal foil, 10: Through hole, 11, 11': Lead-free low-melting glass, 12, 12': Lead-free low-melting metal, 13, 13': Coating, 14: Magnet, 15: Edge portion, 16: Space, 17: Heat resistant clip, 18: Vacuum pump, 19: Vacuum heating furnace, 20: Exhaust hole, 21: Exhaust pipe, 22: Electric heater, 23: Dispenser, 24: Cylindrical heater, 25: Thermometer, 26: Ribbon foil of iron-nickel series alloy or iron-nickel-chromium series alloy, 27: Layer of aluminum metal or aluminum series alloy.

What is claimed is:

1. A vacuum heat insulating member comprising:
a first substrate;
a second substrate;
a sealing part disposed between the first substrate and the second substrate, wherein the sealing part includes a glass phase and a metal phase; and
an internal space that is formed by surrounding by the first substrate, the second substrate and the sealing part, wherein the metal phase is disposed on a side of the internal space of the glass phase, wherein the metal phase of the sealing part is between 20% and 70% by volume of the sealing part.

2. The vacuum heat insulating member according to claim 1,
wherein the glass phase is made of a lead-free low-melting glass containing a vanadium oxide and a tellurium oxide, and
the metal phase is made of a low-melting metal containing tin.

3. The vacuum heat insulating member according to claim 2,
wherein the glass phase further contains a silver oxide, and
the metal phase further contains silver.

4. The vacuum heat insulating member according to claim 1,
wherein the sealing part further includes low thermal expansion filler particles.

5. The vacuum heat insulating member according to claim 4,
wherein the low thermal expansion filler particles contain $Zr_2(WO_4)(PO_4)_2$.

6. The vacuum heat insulating member according to claim 1,
wherein the sealing part includes a ribbon-shaped metal foil, and
the glass phase is disposed on both surfaces of the ribbon-shaped metal foil.

7. The vacuum heat insulating member according to claim 6,
wherein the ribbon-shaped metal foil is formed of one of an iron-nickel series alloy, an iron-nickel-chromium series alloy, an aluminum metal, an aluminum series alloy, and a clad material thereof.

8. The vacuum heat insulating member according to claim 6,
wherein the ribbon-shaped metal foil is a clad material in which a layer of an aluminum metal or an aluminum series alloy is formed on both surfaces of a ribbon-shaped base foil formed of an iron-nickel series alloy or an iron-nickel-chromium series alloy.

9. The vacuum heat insulating member according to claim 6,
wherein the ribbon-shaped metal foil has a plurality of through holes, and the glass phase is present in the through holes.

10. The vacuum heat insulating member according to claim 1,
wherein at least one of the first substrate and second substrate is a glass substrate.

11. The vacuum heat insulating member according to claim 10,
wherein the glass substrate is formed of a tempered glass subjected to a thermal tempering or a chemical tempering.

12. The vacuum heat insulating member according to claim 10, wherein the glass phase of the sealing part is between 30% and 60% by volume of the sealing part.

13. The vacuum heat insulating member according to claim 4, wherein a blending ratio of the low thermal expansion filler particles in the sealing part is between 10% and 35% by volume.

14. The vacuum heat insulating member according to claim 1, wherein the metal phase is left in the glass phase.

* * * * *